United States Patent [19]

Asami et al.

[11] Patent Number: 4,726,604
[45] Date of Patent: * Feb. 23, 1988

[54] REAR SUSPENSION CONTROLLER

[75] Inventors: Ken Asami, Nagoya; Toshio Onuma, Susono; Kaoru Ohashi, Okazaki; Shuuichi Buma, Toyota, all of Japan

[73] Assignee: Toyota Jidosha Kabushiki Kaisha, Japan

[*] Notice: The portion of the term of this patent subsequent to Mar. 3, 2004 has been disclaimed.

[21] Appl. No.: 822,195

[22] Filed: Jan. 24, 1986

[30] Foreign Application Priority Data

Jan. 28, 1985 [JP] Japan .................................. 60-16216
Jan. 28, 1985 [JP] Japan .................................. 60-16218
Feb. 14, 1985 [JP] Japan .................................. 60-28547

[51] Int. Cl.$^4$ ........................................... B60G 17/00
[52] U.S. Cl. .................................................. 280/707
[58] Field of Search ........ 280/707, 6 H, 6 R, DIG. 1, 280/705, 709; 188/299

[56] References Cited

U.S. PATENT DOCUMENTS

| | | | |
|---|---|---|---|
| 2,973,969 | 3/1961 | Thall | 280/124 |
| 3,632,131 | 1/1972 | Engfer | 280/707 |
| 4,162,083 | 7/1979 | Zabler | 280/703 |
| 4,350,354 | 9/1982 | Dotti et al. | 280/6 H |
| 4,540,188 | 9/1985 | Meloche et al. | 280/6 R |
| 4,589,676 | 5/1986 | Meloche et al. | 280/707 |
| 4,593,920 | 6/1986 | Natsume et al. | 280/6 R |

FOREIGN PATENT DOCUMENTS

| | | |
|---|---|---|
| 56-31861 | 3/1981 | Japan . |
| 59-63218 | 9/1982 | Japan . |
| 57-172808 | 10/1982 | Japan . |
| 59-23713 | 2/1984 | Japan . |
| 59-23712 | 2/1984 | Japan . |
| 47711 | 3/1985 | Japan .................................. 280/707 |

OTHER PUBLICATIONS (840,258) Mizuguchi, M., Chassis Electronic Control System for the Mitsubishi 1984 Galant, Societ of Automotive Engineers, 3184, 280-707.

Primary Examiner—John J. Love
Assistant Examiner—Karin L. Ferriter
Attorney, Agent, or Firm—Parkhurst & Oliff

[57] ABSTRACT

A near rear suspension controller for a vehicle having a suspension between a vehicle body and a rear wheel includes: a front height detection section for measuring a distance between the vehicle body and a front wheel for generating a front height signal; a judgement section for generating a judgment result signal when the front height signal exceeds a predetermined range; and a rear height control section for increasing the rear vehicle height when it receives the judgment result signal.

10 Claims, 47 Drawing Figures

Fig. 9A
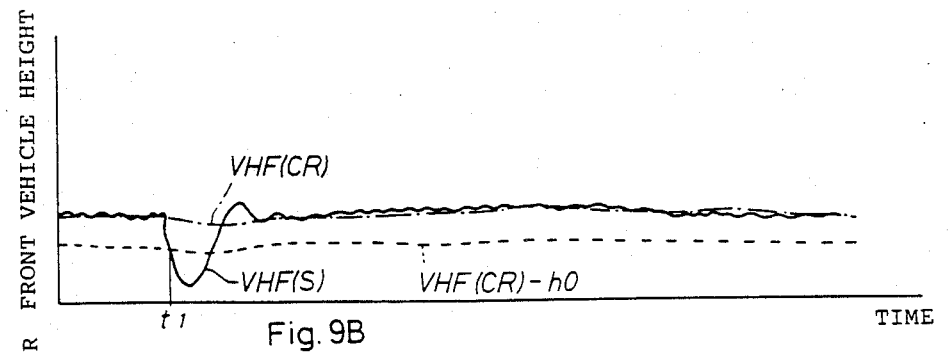
Fig. 9B
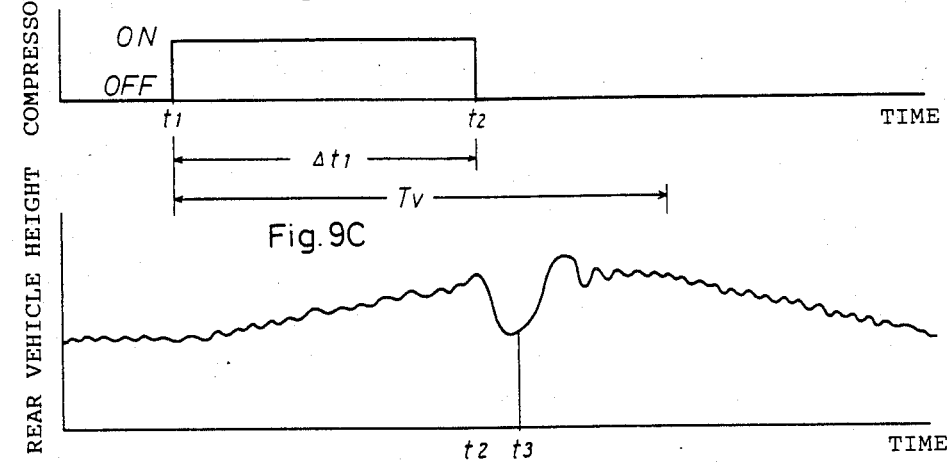
Fig. 9C
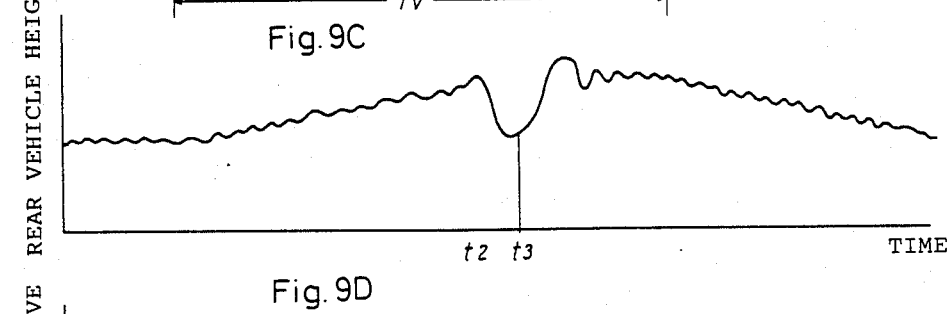
Fig. 9D
Fig. 9E
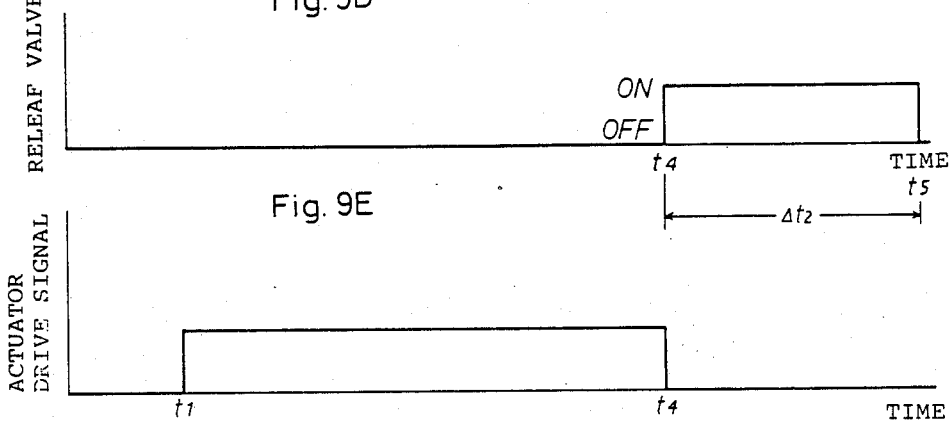

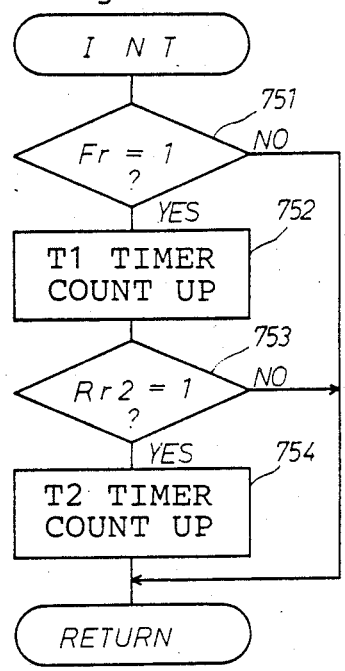

REAR SUSPENSION CONTROLLER

BACKGROUND OF THE INVENTION

1. Field of the invention

The present invention relates to a rear wheel suspension controller having means of adjusting vehicle height and changing suspension characteristic by detecting bumps and dips of the road surface during vehicle running.

2. Prior art

In the past, the suspension controllers of this kind were proposed in the published unexamined patent applications Sho-57-172808, Sho-59-23713 and Sho-59-23712. Such controllers detect the vehicle height and the acceleration of vertical movement by a vehicle height sensor, and judge as 'bad road condition' if the detected value exceeds a predetermined value for a certain period of time. After that, the vehicle height is raised to improve the feel of the ride and to prevent the vehicle bottom from contacting the road surface.

In the conventional controllers, however, the vehicle height is changed only in the case that the vehicle continues running on a bad road for a certain period, in other words, the vehicle height is not changed when the vehicle is tranversing a joint of the road or a sporadic bump or dip. Because of this, when a rear wheel passes the sporadic bump or dip after a front wheel has passed it, the vehicle bottom may come in contact with the road surface by the rear vehicle height vibration. In addition, when the vehicle height is kept low by the conventional control when the vehicle is running on a rough rod, the shortening of the shock absorber reaches its limit to bottom out, whereby the strong vibration is directly transmitted to the vehicle body via the shock absorber, which results in degrading the comfort of the ride.

SUMMARY OF THE INVENTION

Accordingly one object of this invention is to provide a novel rear suspension controller which appropriately changes the rear vehicle height by controlling suspensions provided between a body of a vehicle and its rear wheels, in order to provide occupants of the vehicle with a good feel of ride when the vehicle passes a sporadic bump or dip of a road surface.

The second object of the invention is to alter the characteristic of the rear suspensions of the vehicle running on a road surface with such a sporadic bump or dip like a joint of road patches to keep the feel of ride thereof good.

The third and last object of the invention is to apply the above-mentioned control not only to one type of suspension but also to other various types of suspensions.

This and other objects are achieved according to the invention means as shown in FIG. 1, which is a schematic block diagram indicating the basic idea of the present invention. The novel rear suspension controller for a vehicle having a suspension between a body M1 and a rear wheel WR of the vehicle includes:

a front height detection means M2 for measuring a distance between the vehicle body M1 and a front wheel WF for generating a front height signal indicating the height of the vehicle;

a judgment means M3 for generating a judgment result signal when the front height signal exceeds a predetermined range; and a rear height control means M6 for increasing the rear vehicle height when said judgment means M3 generates the judgment result signal.

The front vehicle height detection means M2 detects the distance between the front wheel WR and the body M1 to generate the front height signal. The front height signal includes the variation of the vehicle height from the average, the speed or the acceleration of the vibration, and the amplitude of the vibration of the vehicle. In this invention sporadic bumps and dips are detected as the front height signal in the main.

The judgment means M3 receives the front height signal from the front height detection means M2, and compares the signal with a predetermined range. In case that the front height signal exceeds the range, the rear height control means M6 changes the rear vehicle height by controlling air or liquid flow into or from suspension gas chambers or liquid chambers or by utilizing a mechanical height adjustment devices.

The suspension characteristic includes the spring constant of the rear suspension springs, the damping force of the rear shock absorbers, the stiffness of bushs fitted in joints of rear suspension arms, and the compliance of a rear stabilizer.

When a bump or a dip is detected by the front height detection means M2, the scale of the bump or the dip is judged by the judgment means M3, and the result is transmitted to the rear height control means M6. If the scale of the bump or the dip exceeds the predetermined range, the rear vehicle height is raised by the rear height control means M6.

Moreover, the rear suspension controller may includes a rear suspension characteristic alteration means which alters the rear suspension characteristic, for example to a 'SOFT' state. The bottoming limit is expanded by the alteration, which results in improving the feel of the ride and preventing the rear bottom from being contact with the road surface, together with the rear height control means.

BRIEF DESCRIPTION OF THE DRAWINGS

A more complete appreciation of the invention and many of the attendant advantages thereof will be readily obtained as the same becomes better understood by references to the following detailed description when considered in connection with the accompanying drawings.

FIGS. 9A-9E are timing charts of the first embodiment.

FIGS. 19A, 19B and 19C is a flowchart showing process steps performed in the third embodiment. FIG. 19C is a flowchart for the timer counter up of the third embodiment.

DETAILED DESCRIPTION OF THE PREFERRED EMBODIMENTS

Figure 1:
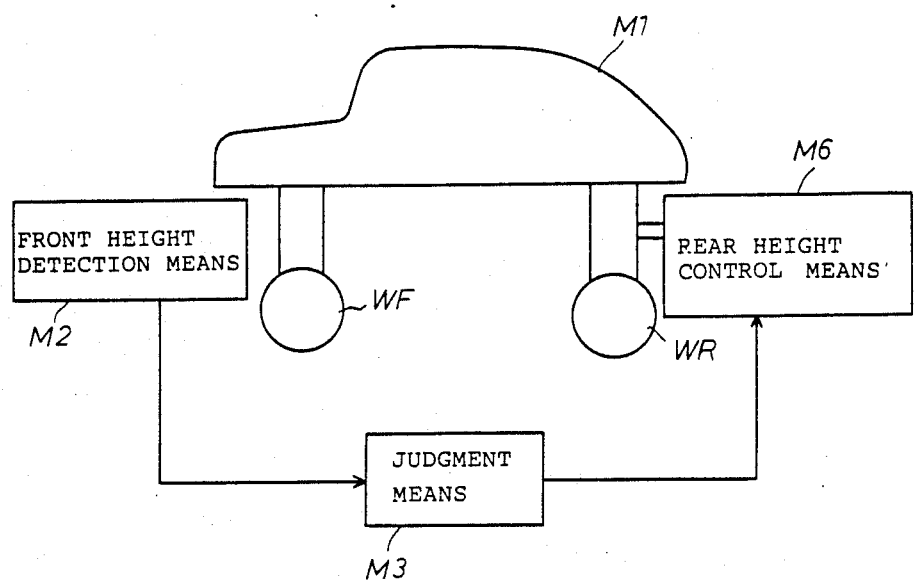
FIG. 1 is a schematic block diagram showing the basic idea of the present invention.
Figure 2:
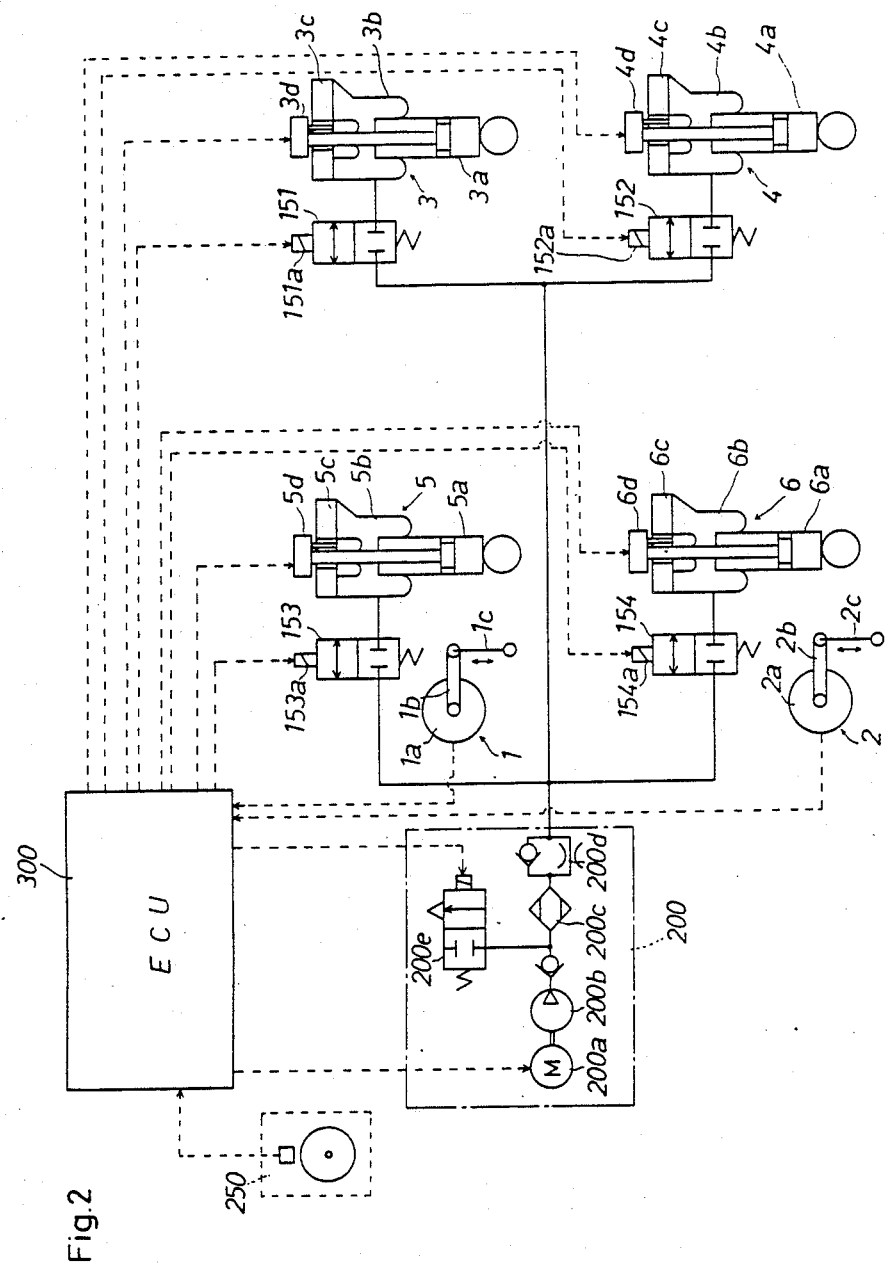
FIG. 2 is a system diagram showing the first embodiment.

Referring now to the drawings, wherein like reference numeral designate identical or corresponding parts throughout the several views, FIG. 2 shows preferred embodiment of the rear height controller according to the invention applied to an automobile having independent air suspensions and a height adjusting system.

A right front height sensor 1 is provided between the body and right front wheel of the automobile to detect the distance between the automobile body and a right suspension arm, which follows the motion of the wheel. A left front height sensor 2 is provided between the body and left front wheel to detect the distance between the body and the left suspension arm. The short cylindrical sensor bodies 1a and 2a of the front height sensors 1 and 2 are secured on the automobile body. Links 1b and 2b extend from the center shafts of the sensor bodies 1a and 2a almost perpendicularly to the center shafts. Turnbuckles 1c and 2c are rotatably coupled to the ends of the links 1b and 2b opposite the sensor bodies 1a and 2a. The ends of the turnbuckles 1c and 2c opposite the links are rotatably coupled to portions of the suspension arms. A potentiometer, whose electric resistance changes depending on the rotation of the center shaft of each vehicle height sensor to take out the change in the vehicle height in the form of a voltage change, is built in each of the sensor bodies 1a and 2a. Although the front height sensors of the above-mentioned type are used in this embodiment, height sensors of such other type may be used that plural light interrupters are provided in the body of each sensor, and a disk having a slit coaxial with the center shaft of the sensor turns on or off the light interrupters depending on the change in the vehicle height to detect the height.

FIG. 2 also shows an air suspension 3 which is provided between a suspension arm (not shown) for the right rear wheel of the automobile and the body thereof and extends in parallel with a suspension spring (not shown). The air suspension 3 primarily includes a shock absorber 3a, a main air chamber 3b, an auxiliary air chamber 3c and an actuator 3d and has a spring function, a body height adjustment function and a shock absorber function. The same air suspensions 4, 5 and 6 are provided for the left rear wheel, the right front wheel and the left front wheel of the automobile, respectively.

Figure 3A:
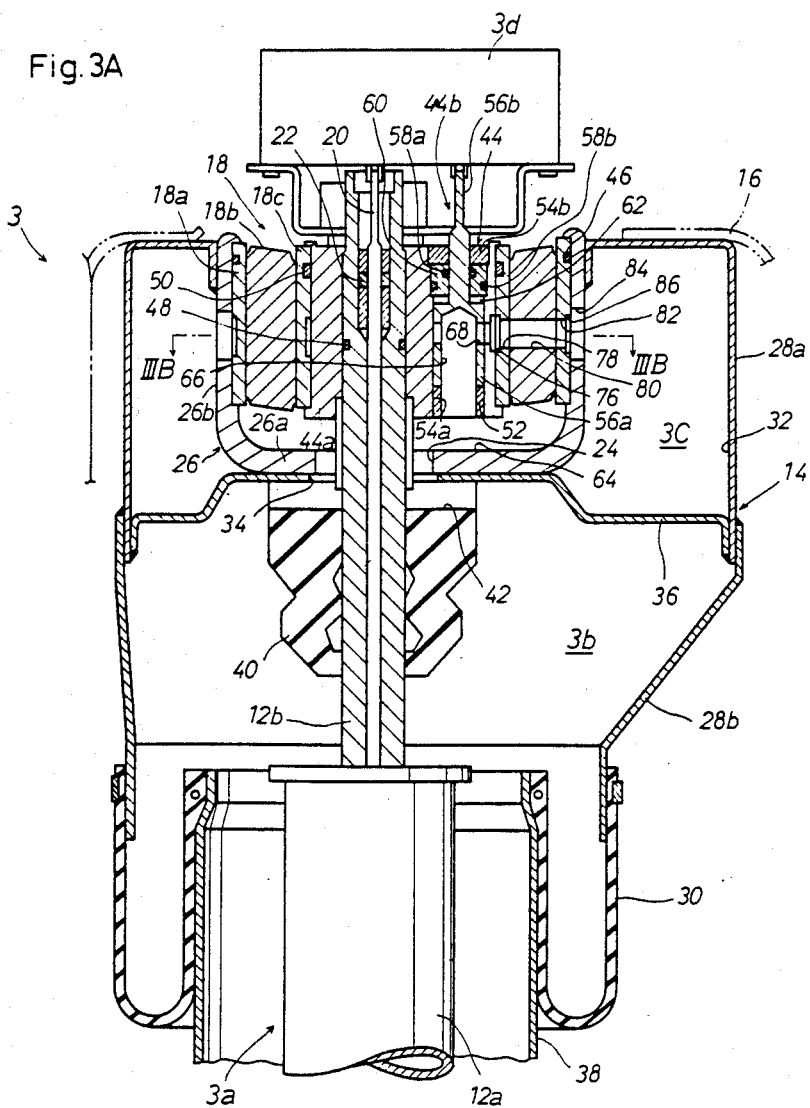
FIG. 3A is a sectional view of the main part of an air suspension of the embodiment.
Figure 3B:
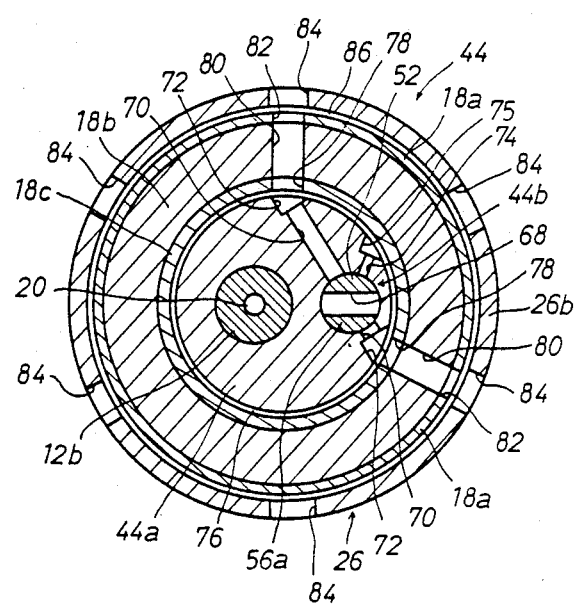
FIG. 3B is a cross-sectional view along aline IIIB—IIIB in FIG. 3A.

FIGS. 3A and 3B show a construction of the main part of the air suspension 3. FIG. 3B shows a cross sectional view along a line IIIB—IIIB shown in FIG. 3A. The other air suspensions 4, 5 and 6 have the same construction as the suspension 3. The air suspension 3 includes a conventional shock absorber 3a composed of a piston and a cylinder 12a, and an air spring unit 14 provided in conjunction with the shock absorber. An axle (not shown) is supported at the lower end of the cylinder 12a of the shock absorber 3a. An elastic cylindrical assembly 18 for elastically supporting a piston rod 12b to the vehicle body 16 is provided at the upper end of the piston rod 12b extending from the piston (not shown) slidably fitted in the cylinder 12a. The shock absorber 3a is a conventional buffer whose damping force can be varied for adjustment by operating the valve function of the piston. A control rod 20 for adjusting the damping force is liquid-tightly and rotatably fitted with a sealing member 22 in the piston rod 12b.

The air spring unit 14 has a chamber 32 which is defined by a circumferential member 26 including a bottom 26a provided with an opening 24, through which the piston rod 12b is allowed to extend, and a wall 26b rising from the peripheral portion of the bottom 26a, an upper housing member 28a covering the circumferential member 26 and secured on the vehicle body, a lower housing member 28b open at the lower end and coupled to the lower end of the upper housing member 28a, and a diaphragm 30 made of an elastic material and closing the lower end of the lower housing member 28b. The chamber 32 is divided into a lower main air chamber 3b and an upper auxiliary air chamber 3c by a partition member 36 secured on the bottom 26a of the circumferential member 26 and having an opening 34 corresponding to the opening 24 provided in the bottom 26a. Both the chambers 3b and 3c are filled with compressed air. The partition member 36 is fitted with a conventional buffer rubber 40 which can be brought into contact with upper end of the cylinder 12a. The buffer rubber 40 has a passage 42 for connecting the openings 24 and 34 to the main air chamber 3b.

The elastic cylindrical assembly 18 is disposed inside the circumferential member 26 whose wall 26b defines the inside circumferential surface of the auxiliary air chamber 3c, in such manner that the assembly 18 surrounds the piston rod 12b. The cylindrical elastic assembly 18 is provided with a valve unit 44 for controlling the communication of both the air chambers 3b and 3c.

The assembly 18 includes an outer cylinder 18a, a cylinderical elastic member 18b and an inner cylinder 18c which are disposed concentrically with respect to each other. The cylindrical elastic member 18b is pressfitted on the wall 26b of the circumferential member 26 secured on the vehicle body, under the action of the upper housing member 28a. The valve casing 44a of the valve unit 44, through which the piston rod 12b is allowed to extend, is secured on the inner cylinder 18c. Since the piston rod 12b is secured on the valve casing 44a, the piston rod is elastically supported to the vehicle body by the cylindrical elastic assembly 18. An annular air sealing member 46 is tightly packed in between the outer cylinder 18a and the bottom 26b of the member 26. An annular air sealing member 48 is tightly packed in between the piston rod 12b and the valve casing 44a. An annular air sealing member 50 is tightly packed in between the inner cylinder 18c and the valve casing 44a.

The valve casing 44a has a hole 52 which is open at both ends and extends in parallel with the piston rod 12b. A rotary valve 44b is rotatably supported in the hole 52. The valve 44b includes a main portion 56a, which can be brought into contact with a loewr positioning ring 54a provided at the lower end of the hole 52, and a small-diameter operating portion 56b projecting from the main portion above the elastic cylindrical assembly 18. An upper positioning ring 54b, which cooperates with the lower positioning ring 54a to prevent the valve 44b from dropping out of the hole 52, is provided at the upper end of the hole 52. An annular sealing base 60 holding an inner air sealing member 58a and an outer air sealing member 58b for tightly closing the hole 52 is provided between the upper positioning ring 54b and the main portion 56a of the valve 44b. A friction reducer 62 for smoothing the rotative motion of the valve 44b when the main portion 56a of the valve is pushed to the sealing base 60 by air pressure is provided between the sealing base and the main portion of the valve.

A chamber 64, which communicates with the main air chamber 3b through the openings 24 and 34 and the passage 42 of the buffer rubber 40, is formed in the lower portion of the elastic cylindrical assembly 18. The main portion 56a of the valve 44b has a recess 66 open to the chamber 64, and has a communication passage 68 extending through the main portion 56a in a diametrical direction thereof across the recess 66.

The valve casing 44a, which houses the valve 44b, has a pair of air passages 70, each of which can communicate at one end with the communication passage 68, as shown in FIG. 4B. The air passages 70 extend on almost the same plane outwards in a diametrical direction of the hole 52, toward the peripheral surface of the valve 44b. The other end of each air passage 70 is open to the peripheral surface of the valve casing 44a through a face hole 72. An air passage 74, which can communicate with the communication passage 68, extends on almost the same place as the pair of air passages 70 toward the peripheral surface of the vale casing 44a, between the pair of air passages 70 outside the hole 52. The diameter of the air passage 74 is smaller than that of each of the air passages 70. The other end of the air passage 74 is open to the peripheral surface of the valve casing 44a through a face hole 75. The inside circumferential surface of the inner cylinder 18c covering the peripheral surface of the valve casing 44a has an annular recess 76 which surrounds the peripheral surface of the valve casing to connect the face holes 72 and 75 for the air passages 70 and 74 to each other.

The inner cylinder 18c has an opening 78 which extends continuously to the recess 76 which constitutes an annular air passage. The cylindrical elastic member 18b has through holes 80, which extend outwards in the radial direction of the member 18b correspondingly to the openings 78. The through holes 80 are made open to the peripheral surface of the outer cylinder 18a through the openings 82 of the cylinder so that the openings 78 and 82 and the through holes 80 define an air passage including the air passages 70 and extending through the elastic cylindrical assembly 18.

The peripheral surface of the wall 26b of the circumferential member 26 covering the outer cylinder 18a are provided with plural openings 84 which are located at equal intervals in the circumferential direction of the member 26 and extend continuously to the auxiliary air chamber 3c to connect the openings 78 and 82 and the through holes 80 to the auxiliary air chamber 3c. The peripheral surface of the outer cylinder 18a is provided with an annular recess 86 which surrounds the outer cylinder at the openings 82 to connect the openings 84, 78 and 82 and the through holes 80 to each other. The openings 84 extend continuously to the recess 86 constituting an annular air passage.

Although the openings 78 and 82 and the through holes 80 are provided correspondingly to the two air passages 70 of the valve casing 44a in the embodiment shown in FIG. 4B, the air passages 70 and 74 can be provided in optional positions in the circumferential direction of the elastic member 18b because the annular air passage 76, with which the air passages 70 and 74 communicate, is formed between the inner cylinder 18c and the valve casing 44a.

A control rod 20 for adjusting the damping force of the shock absorber 3a, and a conventional actuator 3d for rotating the valve 44b of the valve unit 44, are provided at the upper end of the piston rod 12b, as shown FIG. 4A.

Since the air suspension 3 has the above-mentioned construction, the air suspension performs actions described hereinafter. When the valve 44b is in a closed position, as shown in FIG. 4B, the communication passage 68 of the valve does not communicate with any of the air passages 70 and 74 of the valve casing 44a, the main air chamber 3b and the auxiliary air chamber 3c are disconnected from each other so that the spring constant of the suspension 3 is set at a large value. When the actuator 3d has rotated the valve 44b into such a position that the communication passage 68 of the valve communicates with the large-diameter air passages 70 of the valve casing 44a, the main air chamber 3b is communicated with the auxiliary air chamber 3c through the communication passage 68, the large-diameter air passages 70 and the openings 78 and through holes 80 of the elastic assembly 18 and the openings 82 and 84, so that the spring constant of the suspension 3 is set at a small value. When the valve 44b is rotated into such a position by the regulated actuator 3d that the communication passage 68 of the valve communicates with the small-diameter communication passage 74 of the valve casing 44a, the main air chamber 3b is communicated with the auxiliary air chamber 3c through the communication passage 68, the small-diameter air passage 74, the air passage 76, the openings 78 and through holes 80 of the elastic assembly 18 and the openings 82 and 84, so that the spring constant of the suspension 3 is set at an intermediate value because the small-diameter air passage 74 provides a higher air flow resistance than the large-diameter air passages 70.

Leveling valves 151 through 154 are provided for the rear air suspensions 3 through 6, respectively, as shown in FIG. 2. A compressed air feed and discharge system 200, which is described below, is connected to or disconnected from the main air chambers 3b through 6b of the air suspensions 3 through 6 by the leveling valves 151 through 154 depending on whether or not electricity is supplied to solenoids 151a throught 154a. When the leveling valves 151 through 154 are opened, compressed air is fed to the air suspensions, the height of the automobile is increased. If the compressed air is discharged from the air suspensions, the height of the automobile is decreased. When the leveling valves 151 through 154 are closed, the height of the automobile is maintained.

In the compressed air feed and discharge system 200, a compressor 200b is driven by a motor 200a to produce the compressed air. An air drier 200c dries the compressed air to be fed to the air suspensions 3 through 6, to protect pipes and the parts of the air suspensions 3 through 6 from moisture and to prevent unexpected pressure change in the main air chambers 3b through 6b and the auxiliary air chambers 3c through 6c caused by a phase change of the water vapor. When the compressed air is fed to the air suspensions 3 through 6, a check valve 200d provided with a fixed orifice is opened. When the compressed air is discharged from the air suspensions 3 through 6, the check valve 200d is closed so that the air flows out through only the fixed orifice. When the compressed air is discharged from the air suspensions 3 through 6, a releasing solenoid valve 200e is driven so that the compressed air discharged from the air suspensions 3 through 6 through the fixed orifice at the check valve 200d and through the air drier 200c is released into the atmosphere. The solenoid valve 200e can be regulated to change the volume of each of the main air chambers 3b through 6b of the air suspensions 3 through 6 to adjust the height of the automobile.

A vehicle speed sensor 250 is provided in a speedometer, for example, so that the sensor sends out a pulse signal corresponding to a speed of the automobile in response to a rotating speed of an axle of the automobile.

Figure 4:
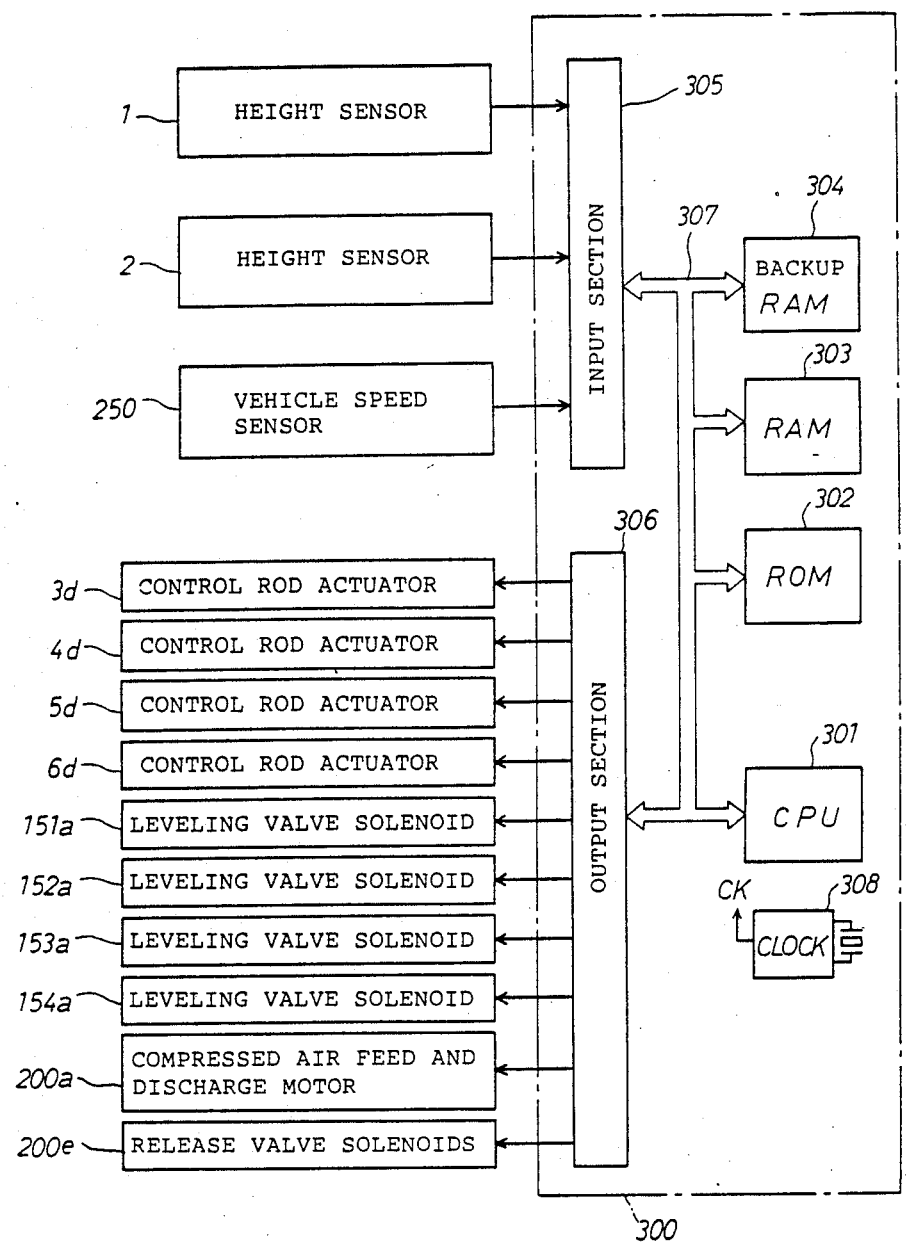
FIG. 4 is a block diagram of an electronic control unit.

The output signals of the front height detectors 1 and 2 and the vehicle speed sensor 250 are entered into an electronic control unit (ECU) 300, which processes these signals to sends out drive signals to the actuators 3d through 6d of the air suspensions 3 through 6, the leveling valves 151 through 154, the motor 200a of the compressed air feed and discharge system 200 and the solenoid valve 200e to perform appropriate control when necessary. FIG. 4 shows a construction of the ECU 300. A central processing unit (CPU) 301 receives the output data from the sensors and performs operations on the data, in accordance with a control program, to carry out processings for the control of various units or means or the like. The control program and initial data are stored in a read-only memory (ROM) 302. The data, which are entered in the ECU 300, and data necessary for operations and control, are stored into and read to of a random-access memory (RAM) 303. A backup RAM 304 is backed up by a battery so that even if the ignition key switch of the automobile is turned off, the backup RAM retains data which are needed after the turning-off of the switch. An input section 305 includes an input port (not shown), a waveshaping circuit if necessary, a multiplexer which selectively sends out the output signals of the sensors to the CPU 301 and an A/D converter which converts an analog signal into a digital signal. An output section 306 includes an output port (not shown) and a drive circuit for driving the actuators according to the control signals of the CPU 301 as occasion demands. A bus 307 connects circuit components such as the CPU 301 and the ROM 302, the input section 305 and the output section 306 to each other to transmit data. A clock circuit 308 sends out a clock signal at preset intervals to the CPU 301, the ROM 302, the RAM 303 and so forth so that a control timing is set by the clock signal.

Figure 5A:
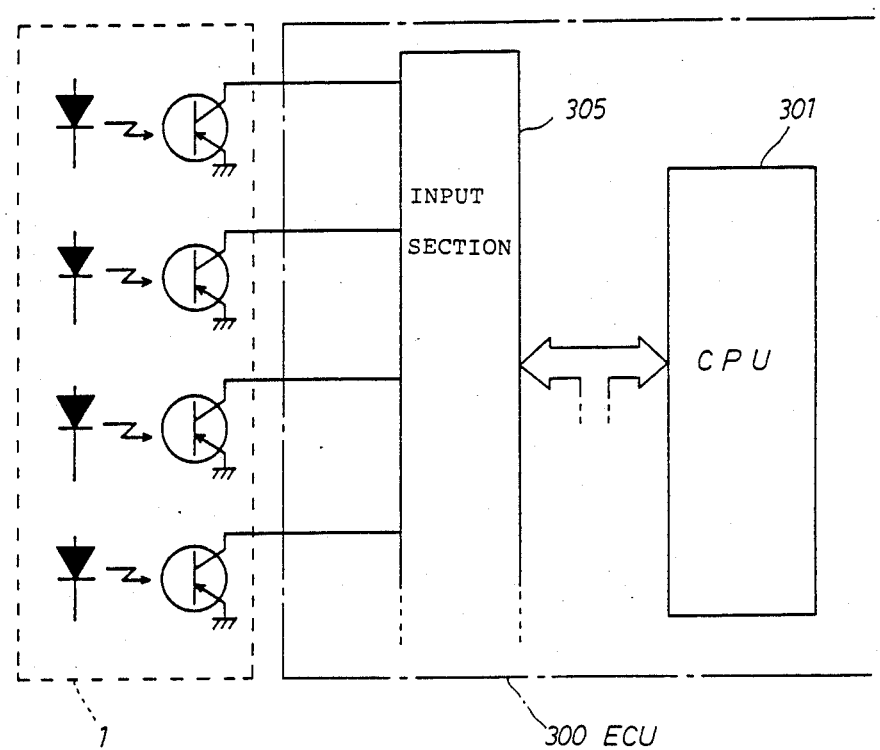
FIG. 5A is a block diagram of an input circuit for a digital vehicle height signal.
Figure 5B:
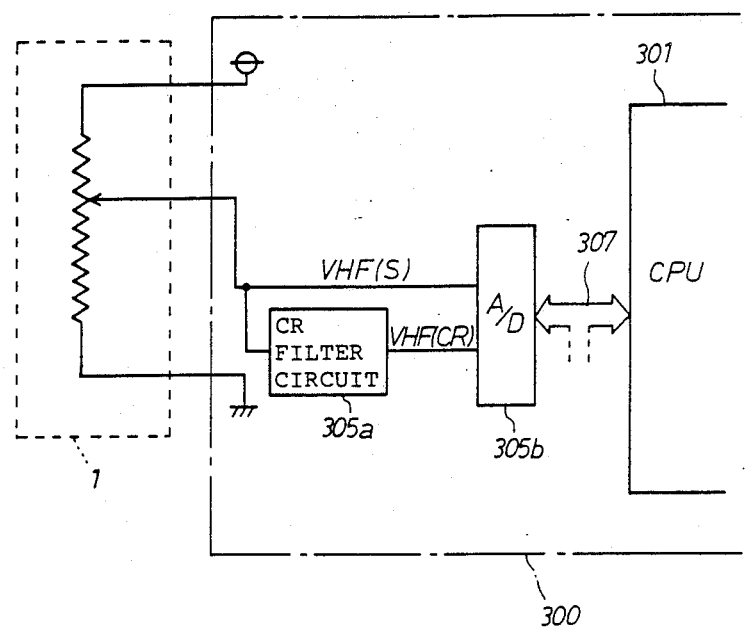
FIG. 5B is a block diagram of an input circuit for an analog vehicle height signal.

If the output signal of the front height sensor 1 is a digital signal, the signal is transmitted to the CPU 301 through the input section 305 including a buffer as shown in FIG. 5A. If the output signal of the front height sensor 1 is an analog signal, a construction as shown in FIG. 5B is adopted. In the latter case, the front height sensor 1 sends out the analog signal of a voltage corresponding to the distance between the body and the right front wheel of the automobile. The analog voltage signal is converted into a voltage VHF(CR) indicating an average height of the vehicle, by a CR filter circuit 305a which is a low-pass filter. The voltage VHF(CR) is applied to an A/D converter 305b. The analog voltage signal is also directly applied as a voltage VHF(S) indicating the current height of the vehicle, to the A/D converter 305b. the converter 305b changes both the input signals into digital signals through the action of a multiplexer. The digital signals are transmitted from the converter the CPU 301. The same thing applies to the left front height sensor 2.

The process, which are performed by the ECU 300, are hereinafter described referring to a flow chart shown in FIGS. 6A, 6B, 6C and 6D. The flow chart indicates the process steps which are performed by the ECU 300 in response to the vehicle height sensors of such a linear type shown in FIG. 5B that the sensors send out analog signals. The process steps are repeatedly performed in every predetermined time such as 5 msec. An outline of the process steps shown in the flow chart are as follows:

(1) A current vehicle height VHF(S) and an average vehicle height VHF(CR) are determined first (Steps 540 and 550).

(2) It is judged whether or not the displacement of the current vehicle height from the average vehicle height has exceeded a predetermined value h0 (Step 580).

(3) If the displacement is judged to have exceeded the predetermined value h0, the characteristic of the rear suspensions is altered in order to get over the bump or dip of the road surface (Step 620). At that time, the rear height is increased in other word, the leveling valves 151 and 152 are opened to activate the solenoid 151a and 152b so that the air is supplied from the compressor 200b to the main chambers 3b and 4b.

(4) After the item (3), at the same time as raising the vehicle height, the rear suspension characteristic is altered (Step 630) to pass the bump or the dip. Namely, to soften the shock at the rear part of the vehicle, the main air chambers 3b and 4b of the suspensions 3 and 4 are communicated with the auxiliary air chambers 3c and 4c by driving the actuators 3d and 4d so as to lower the spring constant of the air spring. As another means, the damping force of the shock absorbers 3a and 4a are decreased. Thus, the rear suspension characteristic is altered to the 'SOFT' state.

The above-mentioned items (1), (2), (3) and (4) are the main process steps for producing the effect of the present invention through this embodiment. In the embodiment, the following item is also performed:

(5) The characteristic of the rear suspensions is returned to the original state afte the rear wheels pass the bump or dip of the road surface (Step 660, 670).

The process steps shown in the flowchart are hereinafter described in detail. The process steps are repeatedly performed in every 5 msec. It is judged whether or not the process steps are being performed for the first time since the activation of the ECU 300 (Step 510). If the process steps are judged to be being performed for the first time, initial setting is carried out (Step 520), all variables are cleared and all flags are reset. After the initial setting is carried out (Step 520) or if the process steps in the routine are being performed for the second time or later, the vehicle speed V is detected (Step 530) in terms of the output signal of the vehicle speed sensor 250. A current vehicle height signal VHF(S) is detected (Step 540). Either of the output signals of the vehicle height sensors for the right and the left front wheels of the vehicle may be used as the current vehicle height signal. Since rear wheels receive a shock whichever of the front wheels moves up on the bump of the road surface or moves down into the dip thereof, either the average value of both the vehicle height signals of the front vehicle height sensors 1 and 2 or the higher one of both the vehicle height signals may be used.

Figure 7:
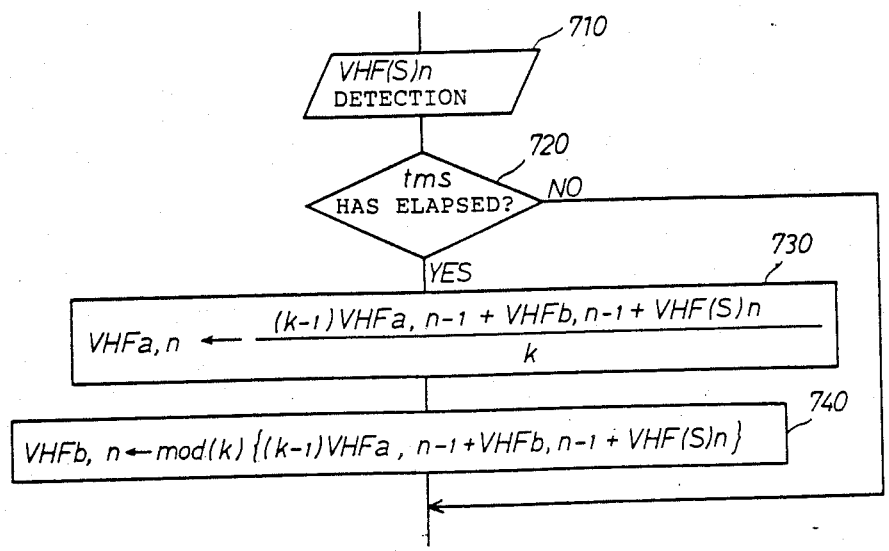
FIG. 7 is a flowchart for calculating an average value of the vehicle height signal.

An average of the past values of the output signal of the vehicle height sensor 1 is determined to set an average vehicle height (Step 550). In this embodiment, the average is directly determined as an average vehicle height signal VHF(CR) from the output signal of the vehicle height sensor 1 through the CR filter circuit 305a made as a low-pass filter shown in FIG. 5B. If the vehicle height sensor 1 sends out a digital signal, the values of the vehicle height signal VHF(S) measured in the ECU 300 in the past may be used to calculate the average. For example, process steps shown in FIG. 7 may be performed instead of those in Steps 540 and 550 shown in FIG. 4, to calculate the average. In the process steps shown in FIG. 7, a current vehicle height signal VHF(S)n is detected first, and an average VHFa,n is then calculated (Steps 730 and 740) in every predetermined operation unit time tms (Step 720). In Step 730, the following calculation is performed:

$$VHFa,n = \{(k-1)VHFa,n-1 + VHFb,n-1 + VHF(S)n\}/k$$

k: Number of measured values to be averaged
VHFa,n: Average to be calculated currently (n-th time)
VHFa,n−1: Average calculated previously ((n−1)-th time)
VHF(S)n: Measured value of current vehicle height
VHFb,n−1: Value calculated previously for convenience to calculate the average VHFa,n In Step 740, VHFb,n is calculated as follows:

$$VHFb,n = mod(k)\{(k-1)VHFa,n-1 + VHFb,n-1 + VHF(S)n\}$$

In such calculation, mod(A) B means the value of the remainder in the division of B by A. The process steps in Steps 730 and 740 constitute such a simple method of determining an average that if only VHFa,n, VHFa,n−1 and VHFb,n−1 are stored in a memory beforehand, a value approximate to the average can be calculated. Since past (k−1) pieces of data do not need to be stored in the simple method, the space of the memory and the time of the calculation are saved. If the space of the memory and the time of the calculation are enough for use, a required number of measured values may be averaged normally.

Returning to FIG. 6A, after the average vehicle height signal is detected (Step 550), it is judged whether or not the control of the suspension is in an automatic mode (Step 560). If the driver of the vehicle has not selected the automatic mode with a manual switch, the process steps in the routine are terminated. If the driver has selected the automatic mode, it is then judged whether or not the vehicle is moving (Step 570). When the detected output of the vehicle speed sensor 250 is not lower than a predetermined value, the vehicle is judged to be moving. In that case, it is judged whether or not the difference between the current vehicle height signal VHF(S) and the average vehicle height signal VHF(CR), namely, the displacement |VHF(S)−VHF(CR)| of the current vehicle height signal VHF(S) from the average vehicle height signal VHF(CR) has exceeded a predetermined reference value h0 (Step 580). If the change is judged to be not larger then the value h0, a flag Fh is reset (Step 590). The flag Fh is for judging whether or not the process steps are being performed for the first time since the displacement exceeded the value h0.

Figure 8:
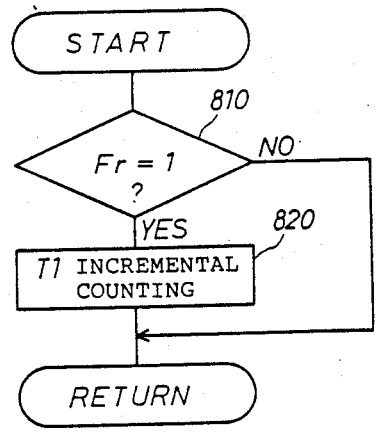
FIG. 8 is a flowchart of a timer count up of the first embodiment.

Step 610 is taken to start a timer T1 and set flags Fh and Fr. The timer T1 is used for counting up the time that the altered rear vehicle height and the suspension characteristic are maintained. The flag Fr is used for judging whether or not the timer T1 should be counting as shown in FIG. 8 indicating a flowchart of a routine which is repeatedly executed in every predetermined time interval. If the flag Fr is already set (Step 810), the timer T1 performs incremental counting (Step 820).

After Step 610, the characteristic of the rear suspensions is altered (Step 620). Namely, by applying an electric supply to the solenoids 151a and 152a of the leveling valves 151 and 152 for a time period of dt1 (delta-t1 in the figure), the valves are opened, and the air supplied from the compressor 200 is sent to the main air chambers 3b and 4b of the air suspensions 3 and 4 so that the vehicle height is increased. This process prevents the rear bottom from contacting the obstacles of the road surface even though the vehicle body sinks when the rear wheels have passed the obstacles. To be exact, the bottom touches neither the top of the bump nor the edge of the dip.

As the vehicle height is kept high, the so-called bottoming state could hardly occur, i.e. the shortening of the suspension does not easily reach the limit, improving the feel of the ride.

At the same time as the vehicle height is increased, the rear wheel suspension characteristic is altered (Step 630). First, the valve 44b rotates by means of the signals sent from the CPU 301 to the actuators 3d and 4d. Next, the main air chambers 3b and 4b of the air suspensions are communicate with the auxiliary air chambers 3c and 4c, thereby the rear suspension characteristic is altered to the 'SOFT' state (small spring constant state). Thus, the shock at the rear wheel can be absorbed. After the characteristic of the rear suspensions is altered (Step 630), a time interval Tv from the time when the bump or dip is detected by the front wheel to the time when the rear wheel passes the bump or dip is calculated on the basis of the current vehicle speed V, in accordance with the following formula (Step 635):

$$Tv = (A1/V) + A2$$

A1: Wheelbase
A2: Compensatory term (constant)

The compensatory term A2 is determined in consideration of the detection lags of the vehicle height sensors 1 and 2, the time taken for the rear wheel to move over the bump or dip, and so forth.

It is judged (Step 640) through comparison with the count of the timer T1 whether or not the time interval Tv calculated in Step 635 has elapsed since the characteristic of the rear suspension was altered. If the count of the timer T1 is judged to be not larger than the timer interval Tv, the process steps in the routine are terminated as they are. If the count of the timer T1 is judged to have exceeded the time interval Tv, in other words, if the time interval Tv is judged to have elapsed since the rear wheel suspension characteristic was altered to be appropriate to the bump or dip of the road surface, the timer T1 is reset and the flag Fr is also reset (Step 650). For that reason, 'NO' is taken in Step 810 for a process step for the incremental counting of the timer T1 as shown in FIG. 8, in the set state of the flag Fr, so that the incremental counting of the timer T1 is stopped.

Finally, a process step for returning the characteristic of the rear suspensions to the original state is performed (Step 660, 670). First, the compressor 200b is stopped. Next the releasing solenoid valve 200e is kept open for a time period of dt2 (delta-t2 in the figure), and the air of the main air chambers 3b and 4b is discharged, thereby the vehicle height is lowered to the original state.

Furthermore, to prevent the shock at the rear wheel, the opened air passage between the main air chambers 3b, 4b and the auxiliary air chambers 3c and 4c is shut off again by turning the valve 44b.

Figure 6A:
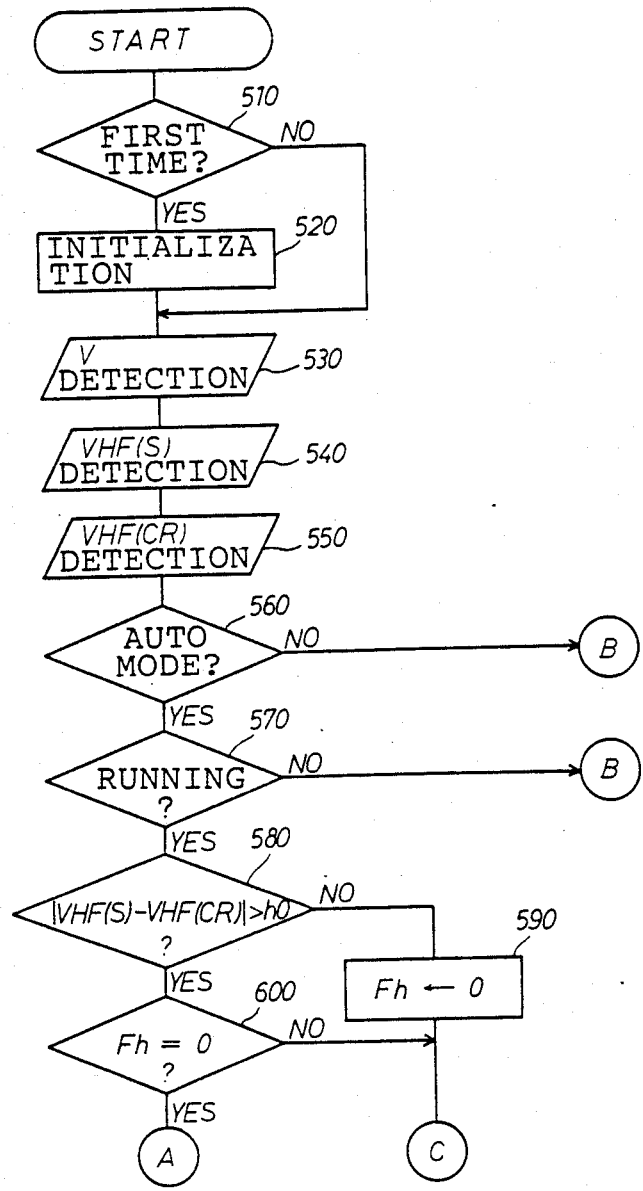
FIGS. 6A–6D are flowcharts showing process steps performed by the electronic control unit in the first embodiment.

While in the abovementioned process, the vehicle height is adjusted by supplying air sent from the compressor 200b for the time period of dt1, and by opening the releasing solenoid valve 200e for the time period of dt2, it is also possible to set a plurality of phases to adjust the vehicle height depending on the scale of the obstacles. Otherwise, the abovementioned time period dt1 and dt2 can be changed to be variable depending on the vehicle speed V, wherein the rear vehicle height is kept high just before the rear wheels pass the bump or the dip. For increasing the vehicle height, the flowchart of FIG. 6C is started. By setting the time T1, and the flag Fr in Step 610 of the FIG. 6B, the vehicle height increasing process is started (Step 622). The time just before the rear wheel passes the bump or the dip is calculated by a formula of $dt1 = A1/V$ (Step 624). When the timer T1 elapses the time dt1, the process is concluded (Step 626, 628).

Figure 6B:
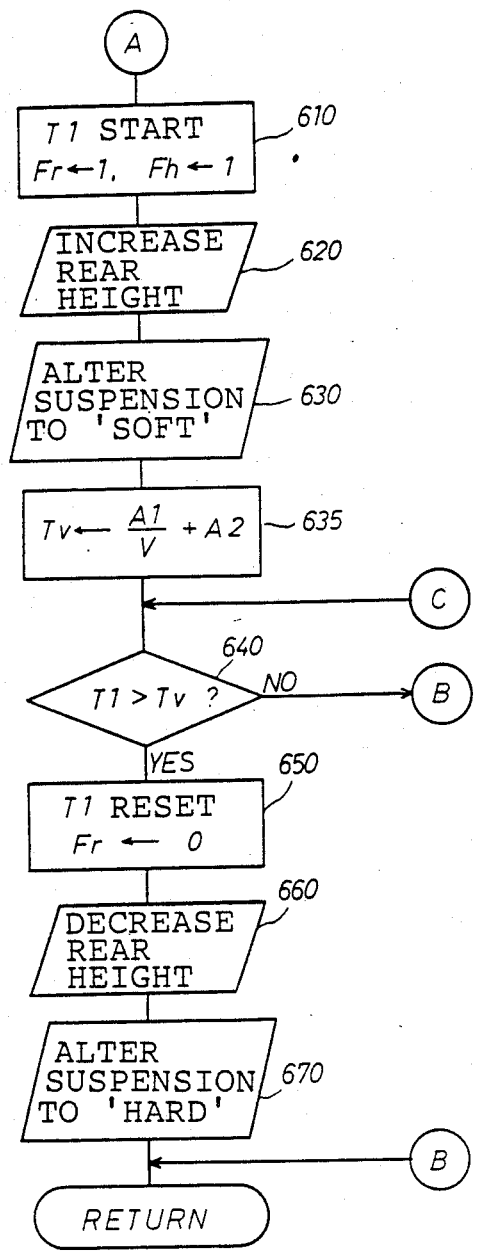
Figure 6C:
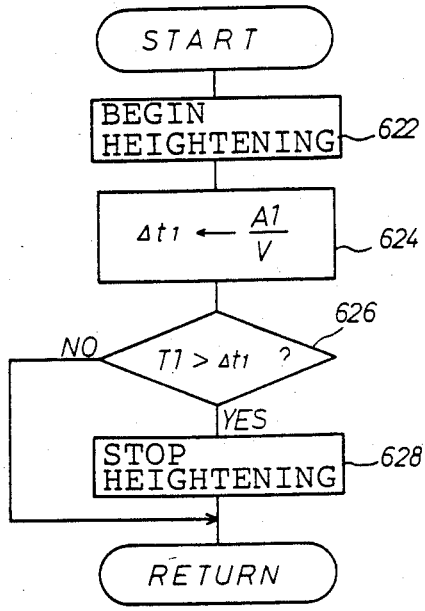
Figure 6D:
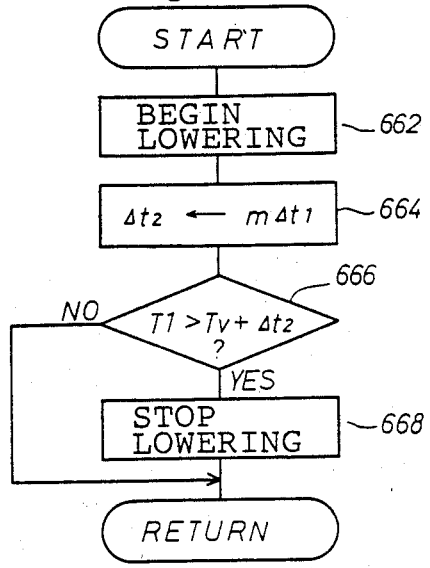

For decreasing the vehicle height, the timer T1 is not reset in Step 650 of FIG. 6B, and the flowchart of FIG. 6D is executed in Step 660. The vehicle height decreasing process is started (Step 662), and the time period dt2 is calculated by a formula of $dt2 = m \times dt1$. In this formula, 'm' is calculated by dividing the time required for lowering the vehicle height to a certain level by the time required for increasing the vehicle height to a certain level. When the timer T1 passed the time interval 'Tv+dt2', the decreasing process is concluded.

As mentioned above, when the front wheels detected a bump or a dip, the rear vehicle height is increased so as not to contact with the road surface, and the shortening limit to the bottoming state of the suspension is expanded to improve the feel of the ride. As the suspension characteristic is altered to the 'SOFT' state at the same time as increasing the vehicle height, more comfortable feel of the ride can be obtained.

FIG. 9 shows time charts of the above-mentioned process steps. FIG. 9 indicates that the vehicle is running on a flat surface of a road before a time point t1. The vehicle height signal VHF(S) obtained from the vehicle height sensors 1 and 2 draws waves of small amplitude. The average vehicle height signal VHF(CR) obtained from the CR filter circuit 305a draws a smoothed form of the waves. When the front wheel of the vehicle begins to move down into the bump of the road surface, the vehicle height signal VHF(S) sharply decreases, and traverses VHF(CR)−h0 at the time point t1. In that case, a relation $|VHF(S) - VHF(CR)| > h0$ is judged to exist in Step 580 of the flowchart shown in FIG. 6A. From the time point t1, the ECU 300 sends out a drive signal to the solenoids 151a and 152a to drive the leveling valves 151 and 152 for the rear air suspensions 3 and 4. By supplying air from the compressor 200b to the air suspensions 3 and 4 for the time period of dt1 between the time point t1 and t2, the rear vehicle height is increased by degrees. From the time point t1, the drive signal is sent to the actuators of air suspensions 3 and 4 to alter the suspension characteristic to the 'SOFT' state. At the time point t3, the rear vehicle height value becomes low after the rear wheels ride on the bump. However, as the rear vehicle height has been already heightened at that time, the vehicle height value is not lower than the level of the normal driving state. Therefore, the vehicle bottom does not contact with the road surface even though the rear wheels bound at a bump. Since the suspension characteristic is in the 'SOFT' state, the shock can be absorbed and the bottoming phenomenon is hardly occured.

The time point t4 is set after the lapse of the time interval Tv since the compressor 200b is started. During the time period dt2 from the time point t4 to t5, the releasing valve 200e is kept open. At the same time as the vehicle height is returned to the normal driving level, the drive signal of actuators of suspensions is stopped, thereby the suspension characteristic is changed to the original state.

In the case of dip, when the present vehicle height VHF(S) exceeds the value VHF(CR)−h0, the vehicle height is increased as same as in the case of bump.

In the abovementioned embodiment, the vehicle height sensors 1 and 2 are utilized for the vehicle height detection means; the compressed air intake exhaust system, leveling valves 151 and 152, and the air suspensions 3 and 4 are utilized for the vehicle height adjustment means; and Step 580 of the flowchart in FIG. 6A is employed to the judgment means; and the air suspensions 3 and 4 are used for the suspension characteristic alteration means.

Figure 10A:
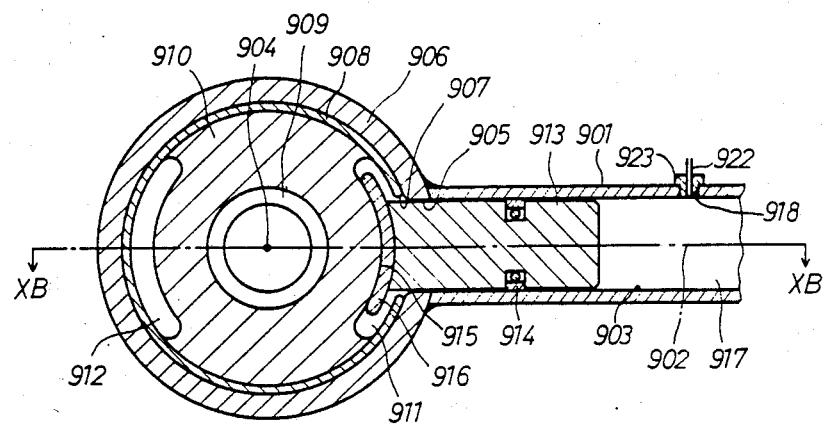
FIG. 10A is a vertical sectional view of another apparatus for altering a suspension characteristic.
Figure 10B:
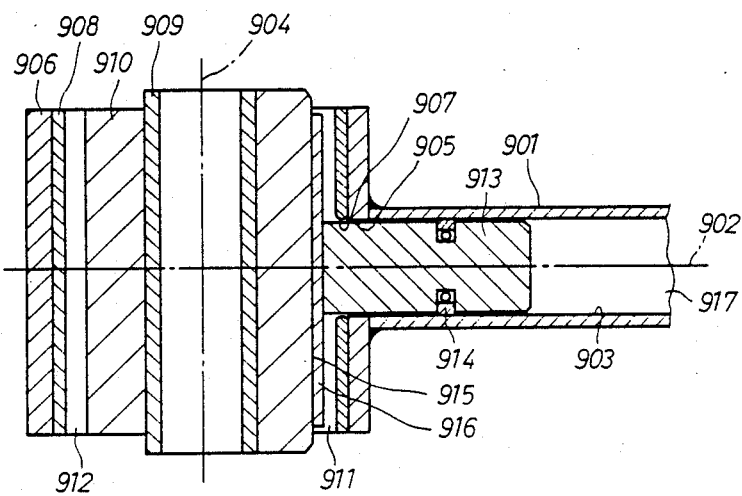
FIG. 10B is a sectional view along a line XB—XB in FIG. 10A.

Examples of other suspension characteristic alteration means not for any air suspension are described below. The first example is bush for a joint of a suspension bar such as the upper and lower control arms of a suspension, as shown in FIGS. 10A and 10B. The bush is provided with a mechanism for changing the stiffness of the bush to alter the characteristic of a suspension. The changing of the stiffness means that of the spring constant or damping force of the bush.

FIG. 10A shows a longitudinal sectional view of the joint of the suspension bar. FIG. 10B shows a sectional view along a line XB—XB shown in FIG. 10A. A control arm 901 extends along an axis 904 perpendicular to the axis 902 is welded around the hole 905 at one end of the control arm 901. An outer cylinder 908 having a hole 907 is press-fitted in the sleeve 906. An inner cylinder 909 is provided in the outer cylinder 908 concentrically thereto. The bush 910 made of vibration-proof rubber is interposed between the outer cylinder 908 and the inner cylinder 909. The bush 910 and the outer cylinder 908 define openings 911 and 912 which are located in the face of each other along the axis 902 and extend as arcs around the axis 904, so that the stiffness in the direction of the axis 902 is set at a relatively low value.

The hole 903 of the control arm 901 constitutes a cylinder which supports piston 913 movably back and forth along the axis 902. A sealing member 914 is tightly packed in between the piston 913 and the inside surface of the hole 903. A contact plate 916 is secured at one end of the piston 913. The contact plate 1916 curves about the axis 904 and extends along the axis so that the plate is brought into tight contact with the inside surface 915 of the opening 911.

The same construction as shown in FIGS. 10A and 10B is provided at the other end of the control arm 901. A cylinder chamber 917 is defined between the piston 913 and another piston not shown in the drawings and fitted with the other end of the control arm 901. The cylinder chamber 917 communicates with the exterior through a tapped hole 918 provided in the control arm 901. A nipple 923 secured on one end 922 of a conduit connected to an oil pressure source not shown in the drawings is secured in the tapped hole 918 to apply oil pressure to the cylinder chamber 917. When the oil pressure in the cylinder chamber 917 is relatively low, the force pushing the piston 913 leftward as to the drawings is so weak that the piston is held in such a position shown in the drawings that the contact plate 916 is brought into light contact with the inner surface 915 of the bush 910. As a result, the stiffness of the bush 910 in the direction of the axis 903 is made relatively low.

When the oil pressure in the cylinder chamber 917 is relatively height, the piston 913 is driven leftward as to the drawings and the contact plate 916 pushes the inner surface 915 of the bush 910 so that the portion of the bush between the contact plate and the inner cylinder 909 is compressed. As a result, the stiffness of the bush 910 in the direction of the axis 902 is heightened.

If the suspension bar is provided between the body and rear wheel of a vehicle, the characteristic of the suspension for the rear wheel can be altered by regulating the oil pressure in the cylinder chamber 917 through the action of an actuator such as a pressure control valve. When the oil pressure is heightened by an instruction from an ECU 300, the stiffness of the bush 910 is enhanced to increase the damping force and spring constant of the suspension to improve the controllability and the stability of the vehicle. When the oil pressure is lowerd, the shock at the rear portion of the vehicle is reduced.

Figure 11A:
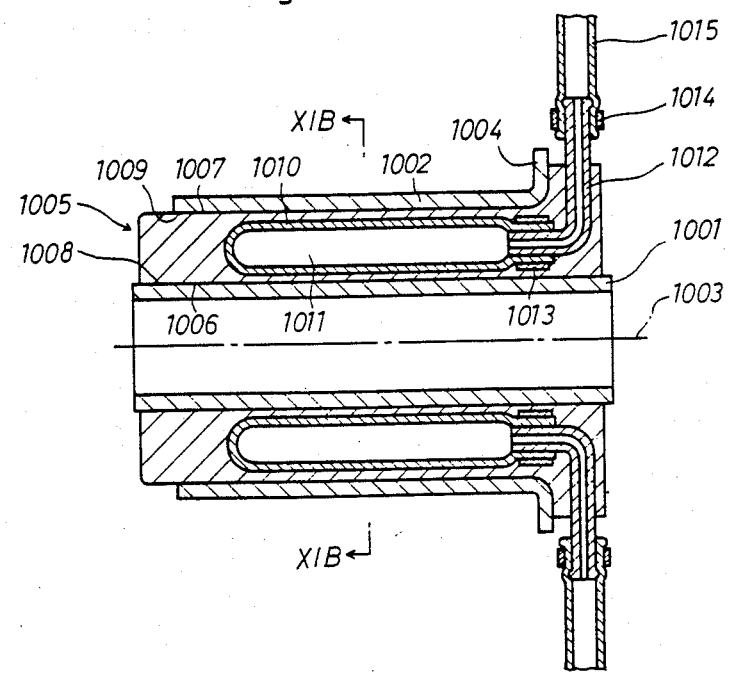
FIG. 11A is a sectional view of another apparatus for altering the suspension characteristic.
Figure 11B:
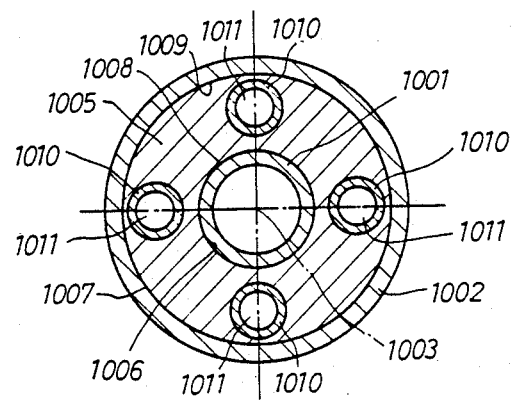
FIG. 11B is a sectional view along a line XIB—XIB in FIG. 11A.

The second example is another bush shown in FIGS. 11A and 11B and having the same function as the former. FIG. 11A shows a longitudinal sectional view of the bush constructed together with an inner and an outer cylinders as a bush assembly. FIG. 11B, shows a sectional view along a line XIB—XIB shown in FIG. 11A. Four expansible and compressible hollow bags 1010, which extend along an axis 1003 and are separately located in equiangular positions around the axis, are embedded in the bush 1005, and define four chambers 1011 extending along the axis 1003 and separately located in equiangular positions around the axis.

Each hollow bag 1010 is secured at one end on one end of a coupler 1012 embedded in the bush 1005, by a clamp 1013, so that the chamber 1011 communicates with the exterior of the bush through the coupler 1012. One end of a hose 1015 is fixedly connected to the other end of the coupler 1012 by clamp 1014, and the other end of the hose 1015 is connected to a compressed air source through an actuator such as a pressure control valve not shown in the drawings, so that controlled air pressure can be introduced into each chamber 1011. When the actuator is put in operation by an ECU 300, the air pressure in each chamber 1011 can be varied to change the stiffness of the bush in a stepless manner. The stiffness of the bush can thus be appropriately changed to be high (hard) or (soft) after a shock at the front wheel of a vehicle is detected.

Figure 12A:
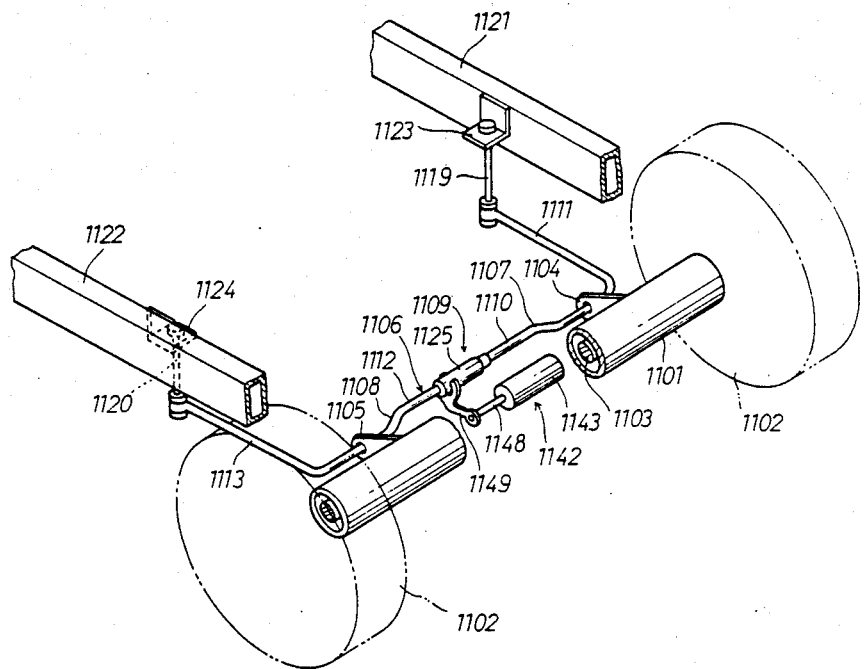
FIG. 12A is a perspective view of another apparatus for altering the suspension characteristic.
Figure 12B:
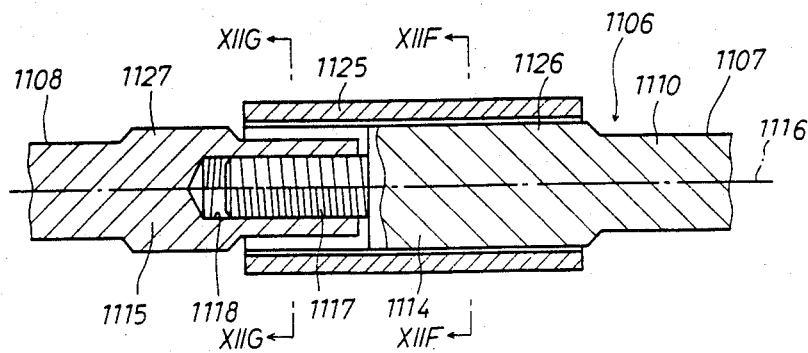
FIGS. 12B and 12C are the detail views in partial section in FIG. 12A.
Figure 12C:
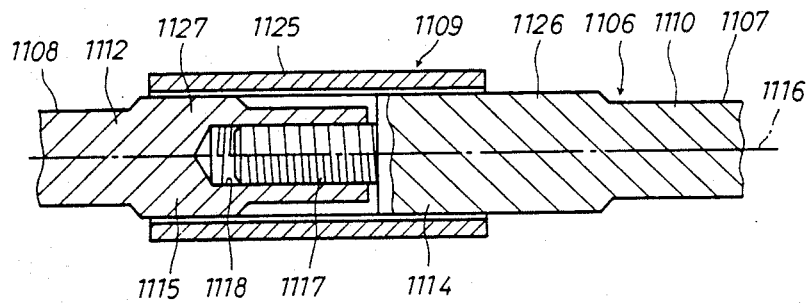
Figure 12D:
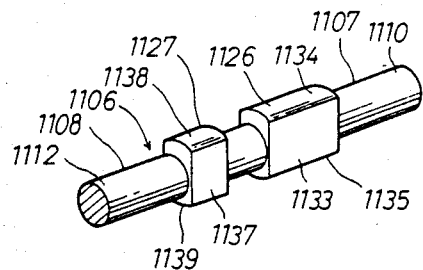
FIG. 12D is a perspective view in FIG. 12A.
Figure 12E:
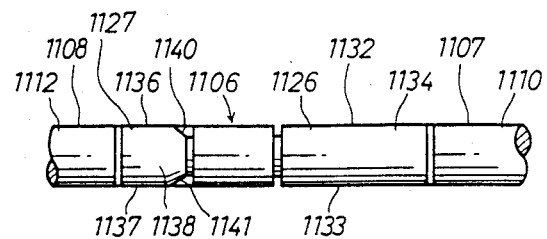
FIG. 12E is a plan view in FIG. 12D.
Figure 12F:
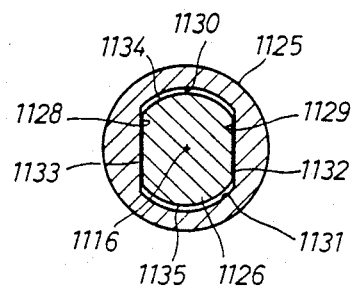
FIG. 12F is a sectional view along a line XIIF—XIIF in FIG. 12B.
Figure 12G:
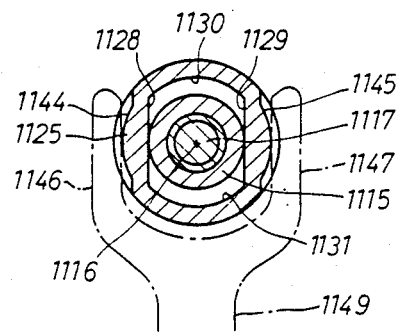
FIG. 12G is sectional view along a line XIIG—XIIG in FIG. 12B.

FIGS. 12A–12G show a construction of a stabilizer as the third example. FIG. 12A shows a exploded oblique view of the torsion-bar-type stabilizer built in the axle-type rear suspension of an automobile. FIGS. 12B and 12C show enlarged partial longitudinal sectional views of the main part of the stabilizer in the coupled and uncoupled states thereof. FIGS. 12D shows an oblique view of the main part shown in FIGS. 12B and 12C and removed of a clutch. FIG. 12E shows a plan view of the main part shown in FIG. 12D. FIG. 12F shows a sectional view along a line XVIF—XVIF shown in FIG. 12B. FIG. 12G shows a sectional view along a line XVIG—XVIG shown in FIG. 12B. An axle 1103 coupled with wheels 1102 is rotatably supported by an axle housing 1101. A pair of brackets 1104 and 1105 are secured on the axle housing 1101, in positions separated from each other in the direction of the width of the automobile. The torsion-bar-type stabilizer 1106 is coupled to bushes not shown in the drawings. The stabilizer 1106 includes a right portion 1107 and the left portion 1108 can be selectively coupled to each other integrally by a coupling unit 1109. A protrusion 1117 and a hole 1118, which extend along an axis 1116, are formed at the ends 1114 and 1115 of rods 1110 and 1112 opposite arms 1111 and 1113, and are provided wtih a male screw and a female screw which are engaged with each other to couple the rods 1110 and 1112 rotatably relative to each other around the axis 1116. The tips of the arms 1111 and 1113 are coupled to brackets 1123 and 1124 secured on the side frames 1121 and 1122 of the vehicle, by links 1119 and 1120. The coupling unit 1109 includes the cylindrical clutch 1125, a clutch guide 1126 which is provided at one end 1114 of the clutch 1125, a clutch guide 1126 which is provided at one end 1114 of the rod 1110 and supports the clutch 1125 unrotatably relative to the guide around the axis 1116 but movably back and forth along the axis, and a clutch bearer 1127 which is provided at the end 1115 of the rod 1112 and bears the clutch 1125 unrotatably relative to the bearer around the axis 1116. The inside circumferential surface of the clutch 1125 includes planes 1128 and 1129 facing each other across the axis 1116 and extending in parallel with each other along the axis, and partially cylindrical surfaces 1130 and 1131 adjoining the planes in positions opposed to each other across the axis 1116, as shown in FIGS. 12F and 12G.

Corresponding to the inside circumferential surface of the clutch 1125, the peripheral surface of the clutch guide 1126 includes planes 1132 and 1133 facing each other across the axis 1116 and extending in parallel with each other across the axis, and partially cylindrical surfaces 1134 and 1135 adjoining the planes in position opposed to each other axis 1116. The peripheral surface of the clutch bearer 1127 include planes 1136 and 1137 facing each other across the axis 1116 and extending in parallel with each other along the axis, and partially cylindrical surfaces 1138 and 1139 are always engaged with those 1128 and 1129 of the clutch 1125. When the clutch 1125 is in a position shown in FIG. 12C, the planes 1136 and 1137 of the clutch bearer 1127 are also engaged with those 1129 and 1128 so that the right portion 1107 and left portion 1108 of the stabilizer are integrally coupled to each other unrotatably relative to each other around the axis 1116. The ends of the planes 1136 and 1136 of the clutch bearer 1127 at the right portion 1107 of the stabilizer are chamfered at 1140 and 1141 so that even if the rods 1110 and 1112 are slightly rotated relative to each other around the axis 1116, the clutch 1125 can be moved from a position shown in FIG. 12B to a position shown in FIG. 12C, to couple the right portion 1107 and left portion 1108 of the stabilizer integrally to each other as the arms 1111 and 1113 of the portions are on the same plane. The clutch 1125 is moved back and forth along the axis 1116 by an actuator 1142 regulated by an ECU 300. The actuator 1142 includes a hydraulic piston-cylinder unit 1143 secured on a differential casing not shown in the drawings, and a shifting fork 1149 which includes arms 1146 and 1147 engaged in the grooves 1144 and 1144 of the peripheral surface of the clutch 1225, as shown in FIG. 12G, and is coupled to the piston rod 1148 of the piston-cylinder unit 1143. When the clutch 1125 is placed in a position shown in FIG. 12C, by the actuator 1142 according to an instruction from the ECU 300, the right portion 1107 and left portion 1108 of the stabilizer 1016 are integrally coupled to each other to put the stabilizer in such a state that it can fulfill its function to reduced the rolling of the vehicle to improve its controllability and stability. When the clutch 1125 is placed in a position shown in FIG. 12B, by the actuator 1142, the right portion 1107 and left portion 1108 of the stabilizer 1016 can be rotated relative to each other around the axis 1116 to reduce the shock on the vehicle, particularly the shock on its wheels on only one side of the vehicle, or improve the feeling of ride of the vehicle.

Figure 13A:
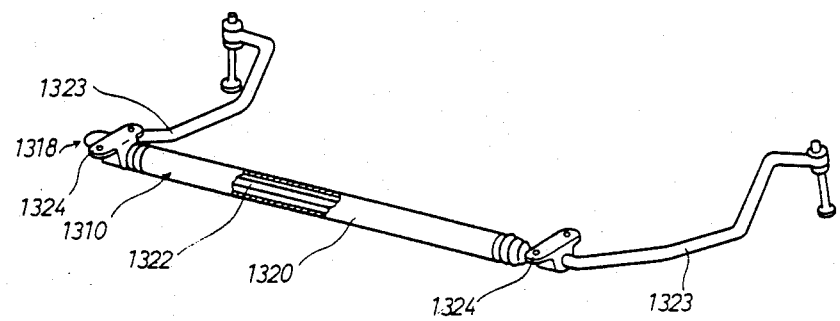
FIG. 13A is a perspective view of another apparatus for altering the suspension characteristic.
Figure 13B:
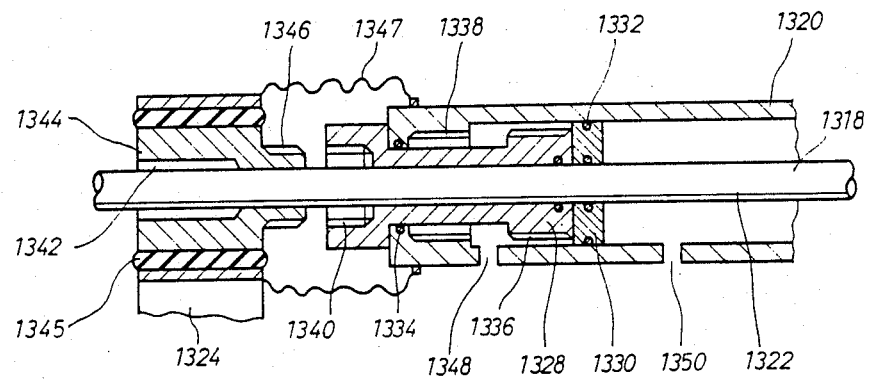
FIG. 13B is a detail view in cross section in FIG. 13A.

FIGS. 13A and 13B show another stabilizere as the fourth example. A stabilizer-bar-type assembly 1310 incldues a first stabilizer bar 1318 and a second stabilizer bar 1320, as shown in FIG. 13A. The first stabilizer bar 1318 includes a main portion 1322 and an arm 1323. The main portion 1322 is attached to the body of a vehicle by a pair of fitting metals 1325 so that the main portion 1322 can be twisted around its axis. The second stabilizer bar 1320 is hollow so that the main portion 1322 of the first stablizer bar 1318 extends through the second stabilizer bar, as shown in FIG. 17B. The second stabilizer bar 1232 is disposed inside the pair of fitting metals 1324 so that the first stabilizer bar 1318 can be connected to and disconnected from the second stabilizer. A piston 1330 on which a spool 1328 is secured is slidably disposed inside one end of the second stabilizer bar 1320 in such a manner that the piston is liquid-tight sealed by a sealing member 1332. The spool 1328 is liquid-tight sealed by a sealing member 1334, and projects out of the second stabilizer bar 1320. The spool 1328 has splines 1336 near the pistons 1330, while the second stabilizer bar 1320 has, at one end, splines 1338 which can be engaged with the s;lines 1336. The spool 1328 has other splines 1340 inside the outwardly proejcting end of the spool. A coupler 1344 is connected to the main portion 1322 of the first stablizer bar 1318 by splines 1342. Splines 1346, which can be engaged with the splines 1340, are provided on the coupler 1344 at the end opposed to the spool 1328. The coupler 1344 is connected to a mounting metal 1324 through a rubber bush 1345, as shown in FIG. 13B, so that the main portion 1322 of the first stabilizer bar 1318 is twisted by deforming the coupler 1344 is fitted is such a position that the splines 1340 are engaged with the splines 1346 when the spool 1328 is moved leftward as to the drawings and the splines 1336 are engaged with the splines 1338. A bellowslike boot 1347 for protecting the splines 1340 and 1346 from dust is provided between the coupler 1344 and the second stabilizer bar 1320. Two ports 1348 and 1350 are provided in the second stabilizer bar 1320 in such a manner that the piston 1330 is located between the ports. Piping is provided to lead a pressure fluid to the ports 1348 and 1350 in use. When the pressure fluid is led to one port 1350 through an actuator such as a pressure control valve, the piston 1330 is moved leftward as to the drawings, together with the spool 1328, the splines 1336 are engaged with the splines 1338, and the splines 1340 are engaged with the splines 1346. As a result, the first and the second stabilizer bars 1318 and 1320 are coupled to each other so that the stiffness of the stabilizer bar assembly is heightened. When the pressure fluid is led to the other port 1348, the piston 1330 is moved rightward and the splines are disengaged from each other. As a result, the stiffness of the stabilizer bar assembly is constituted by only that of the first stabilizer bar 1318.

Figure 14A:
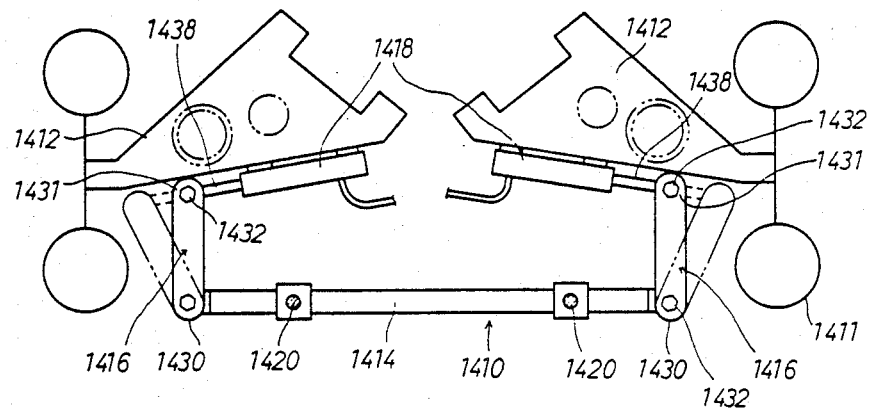
FIG. 14A is a plan view of another apparatus for altering the suspension characteristic.
Figure 14B:
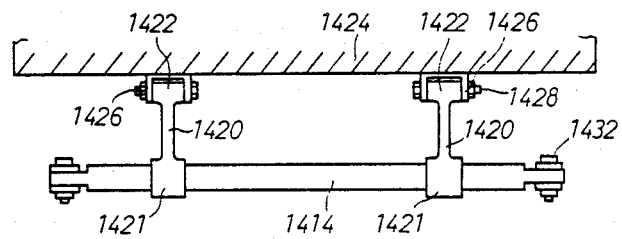
FIG. 14B is a partly pictorial view in FIG. 14A.
Figure 14C:
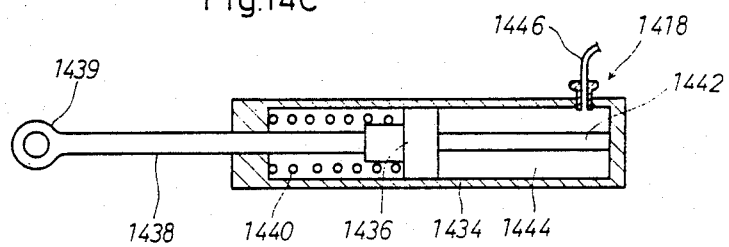
FIG. 14C is a sectional view of a stretching means.

FIGS. 14A, 14B and 14C show still another stabilizer as the fifth example. FIG. 14A shows a plan view of the outline of the stabilizer 1410. Wheels 1411 and suspension arms 1412 are also shown in FIG. 14A. A main part 1414, a pair of arms 1412 are also shown in FIG. 14A.

A main part 1414, a pair of arms 1516 and elongation means 1518 are provided. The main part 1414 like a round bar is laid through the bearing portions 1421 of a pair of links 1420 disposed at a distance from each other in the direction of the width of the body 1424 of a vehicle, and is supported by the bearing portions 1421 so that the main part 1414 can be twisted around its axis. The other bearing portions 1422 of the links 1420 at the upper ends are rotatably supported by pins 1428 extending through brackets 1426 welded on the vehicle body 1424. As a result, the main part 1414 is disposed along the width of the vehicle body, and can be twisted relative to the vehicle body. The pairs of arms 1416 are made of flat bars. The first ends 1430 of the arms 1416 are coupled to the ends of the main part 1414 by blots and nuts 1432 so that the arms can be turned about vertical axes. The second ends 1431 of the arms 1416 are located at a distance from the first ends 1430 in the front-to-rear direction of the vehicle body 1424. The front-to-rear direction includes an oblique longitudinal direction. The second ends 1431 of the arms 1416 are displaced in the direction of the width of the vehicle body 1424 by the elongation means 1418 made of power cylinders. Each of the power cylinders includes a cylinder 1434, a piston 1436 liquid-tightly and slidably fitted in the cylinder 1434, a piston rod 1438 coupled at one end to the piston 1416 and projecting at the other end out of the cylinder 1434, and a included spring 1440 for displacing the piston 1436 in such a direction as to retract the piston rod 1438. A stopper 1442 secured on the piston 1436 prevents the piston from being displaced more than a predetermined quantity. The cylinder 1434 is secured on the suspension arm 1412 in such a manner that the piston rod 1438 is located more outside than the cylinder 1434 in the direction of the width of the vehicle body. The section end 1431 of the arm 1416 is coupled to the outwardly projecting end of the piston rod 1438 by a bolt and nut 1432 so that the arm 1416 can be turned about the vertical axis. One end of a flexible hose 1446 is connected to the liquid chamber 1444 of the cylinder 1434 opposite the side on which the included spring 1440 is located. The other end of the flexible hose 1446 is connected to a pressure generator (not shown in the drawings) through an actuator such as pressure control valve. Unless pressure is applied to the liquid chambers 1444 of the power cylinders according to the state of the actuator corresponding to an instruction from an ECU 300, the second end 1431 of the arms 1416 are located in inner positions as shown in FIG. 14A, so that the wheel rate of the stabilizer is low. When the actuator is operated to apply pressure to the liquid chambers 1444 of the power cylinders, the pressure acts to the pistons 1436 to push out the piston rods 1438 against the compressed springs 1440. As a result, the second ends 1431 of the arms 1416 are pushed out as shown by imaginary lines, i.e. double dotted lines, in FIG. 14A, to increase the arm ratio of the stabilizer to heighten its stiffness against the rolling of the vehicle.

Figure 15A:
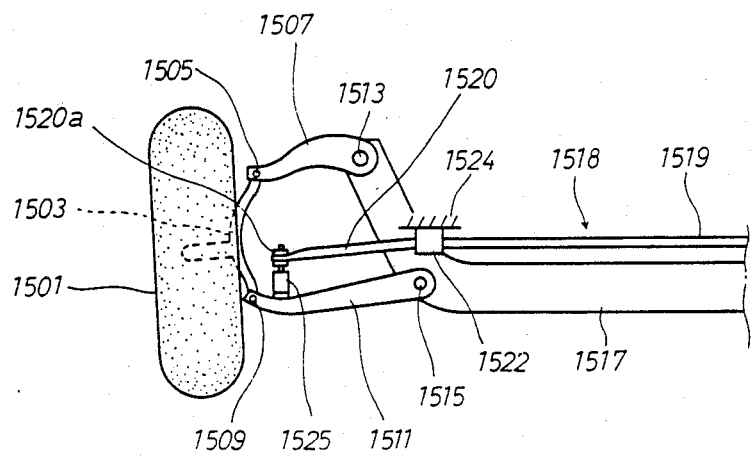
FIG. 15A is a partly plan view of another apparatus of altering the suspension characteristic.
Figure 15B:
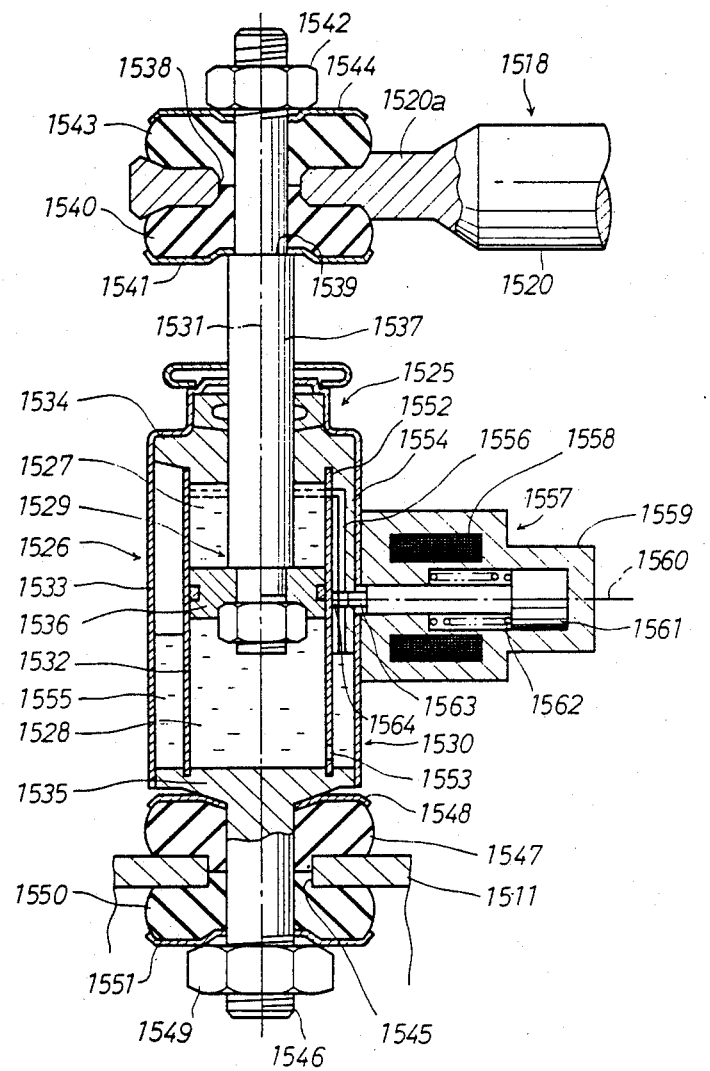
FIG. 15B is a detail cross sectional view of connecting apparatus in FIG. 15A.

FIGS. 15A and 15B show a construction of coupling unit for a stabilizer and a lower control arm, as the sixth example. FIG. 14A shows a partial front view of a wishbone-type suspension including the coupling unit for the stabilizer for a vehicle. FIG. 14B shows an enlarged sectional view of the coupling unit shown in FIG. 14A. A wheel 1501 is rotatably supported by a knukcle 1503. The knuckle 1503 is pivotally coupled at the upper end to one end of an upper control arm 1507 by a pivot 1505, and pivotally coupled at the other end to one end of the lower control arm 1511 by a pivot 1509. The upper control arm 1507 and the lower control arm 1511 are pivotally coupled to the cross member 1517 of the vehicle by pivots 1513 and 1515. The stabilizer 1518, which is shaped as U, is disposed along the width of the vehicle.

The stabilizer 1518 is coupled at its central rod 1519 to the body 1524 of the vehicle by brackets 1522 with rubber bushes not shown in the drawings, so that the stabilizer can be turned about its axis. The tip 1520a of the arm 1520 of the stabilizer 1518 is coupled to a point near one end of the lower control arm 1511 by the coupling unit 1525. The coupling unit 1525 includes a piston-cylinder assembly 1526 composed of a piston 1529 and a cylinder 1530 which define two cylinder chambers 1526 and 1528. The cylinder 1530 includes an inner cylinder 1532 which supports the piston 1529 movably back and forth along an axis 1531, and outer cylinder 1533 disposed substantially concentrically to the inner cylinder 1532, and end caps 1534 and 1535 which close both the ends of the inner cylinder and the outer cylinder. The piston 1529 includes a main portion 1536, and a piston rod 1537 which bears the main portion 1536 at one end of the piston rod and extends along the axis 1131 through the end cap 2534 and the hole 2538 of the tip of the arm 1520 of the stabilizer 1518. A rubber bush 1540 and a retainer 1541 for holding the bush are interposted between the shoulder 1539 of the piston rod 1537 and the tip 1520a. A rubber bush 1543 and a retainer 1544 are interposed between the tip 1520a and a nut 1542 screwed on the front end of the piston rod 1537. As a result, the piston rod 1537 is coupled to the tip 1520a of the arm 1520 of the stabilizer 1518 so that an impulsive force is damped.

A rod 1546, which extends along the axis 1531 through a hole 1545 of the lower control arm 1511, is secured on the end cap 1535. A rubber bush 1547 and a retainer 1548 for holding the bush are interposed between the end cap 1535 and the lower control arm 1511. A rubber bush 1550 and a retainer 1551 for holding the bush are interposed between the lower control arm 1511 and a nut 1549 screwed on the front end of the rod 1546. As a result, the rod 1546 is coupled to the lower control arm 1511 so that an impulsive force is damped. The inner cylinder 1532 is provided with through holes 1552 and 1553 near the end caps 1534 and 1535. The end cap 1534 is integrally provided with a projection 1554 extending along the axis 1531 between the inner cylinder 1532 and the outer cylinder 1533 and located in tight contact with the inner and the outer cylinders. The projection 1554 has an internal passage 1556 which is coincident at one end with the through hole 1552 and is opened at the other end into an annular space 1555 between the inner cylinder 1532 and the outer cylinder 1533. As a result, the through hole 1552, the internal passage 1556, the annular space 1555 and the other through hole 1553 constitute a passage means for conencting both the cylinder chambers 1527 and 1528 to each other.

A portion of the annular space 1555 is filled with air. Portions of the cylinder chambers 1527 and 1528, the internal passage 1556 and the annular 1555 are filled with oil. The change in the volume of the piston rod 1537 in the cylinder 1530, which is caused by the displacement of the piston 1529 relative to the cylinder, is compensated by the compression or expansion of the air filled in the portion of the annular space 1555. The communication of the internal passage 1556 is selectively controlled by normally-opened solenoid valve 1557. The solenoid valve 1557 includes a housing 1559 containing a solenoid 1558 and secured at one end on the outer cylinder 1533, a core 1561 supported in the housing 1559 movably back and forth along an axis 1560, and a compressed helical spring 1562 for urging the core 1561 rightward as to FIG. 15B.

A valve element 1563 is integrally provided at one end of the core 1561 so that the valve element is selectively fitted into a hole 1564 extending in the projection 1554 across the internal passage 1556. When no electricity is applied to the solenoid 1558 according to an instruction from an ECU 300, the core 1561 is urged rightward as to the drawing, by the compressed helical spring 1562, to open the valve 1557 to allow the communication of the internal passage 1556. When electricity is applied to the solenoid 1558 according to an instruction from the ECU 300, the core 1561 is driven leftward as to the drawings, against the force of the compressed helical spring 1562, to fit the valve element 1563 into the hole 1564 to shut the internal passage 1556. At that time, the cylinder chambers 1527 and 1528 are disconnected from each other, and the oil in the cylinder chambers is kept from flowing to the opposite cylinder chambers, so that the piston 1529 is hindered from moving relative to the cylinder 1530 along the axis 1531. As a result, the stabilizer 1518 is put in such a state that it can fulfill its function to suppress the rolling of the vehicle to improve the controllability and the stability of the vehicle as its wheel on one side moves up on a bump of a road surface for the vehicle and down into a dip of a road surface. When no electricity is applied to the solenoid 1558, the solenoid valve 1557 is maintained in an open position shown in FIG. 15B, so that the oil in both the cylinder chambers 1527 and 1528 can freely flow to the opposite cylinder chambers through the internal passage 1556 and so forth. As a result, the piston 1529 can freely move relative to the cylinder 1530 so that the tips of both the right and left arms 1520 can freely move relative to the corresponding lower control arms 1511. For that reason, the stabilizer does not fulfill its function, so that the shock at each rear wheel of the vehicle is reduced to keep the feel of ride of the vehicle good.

Figure 16:
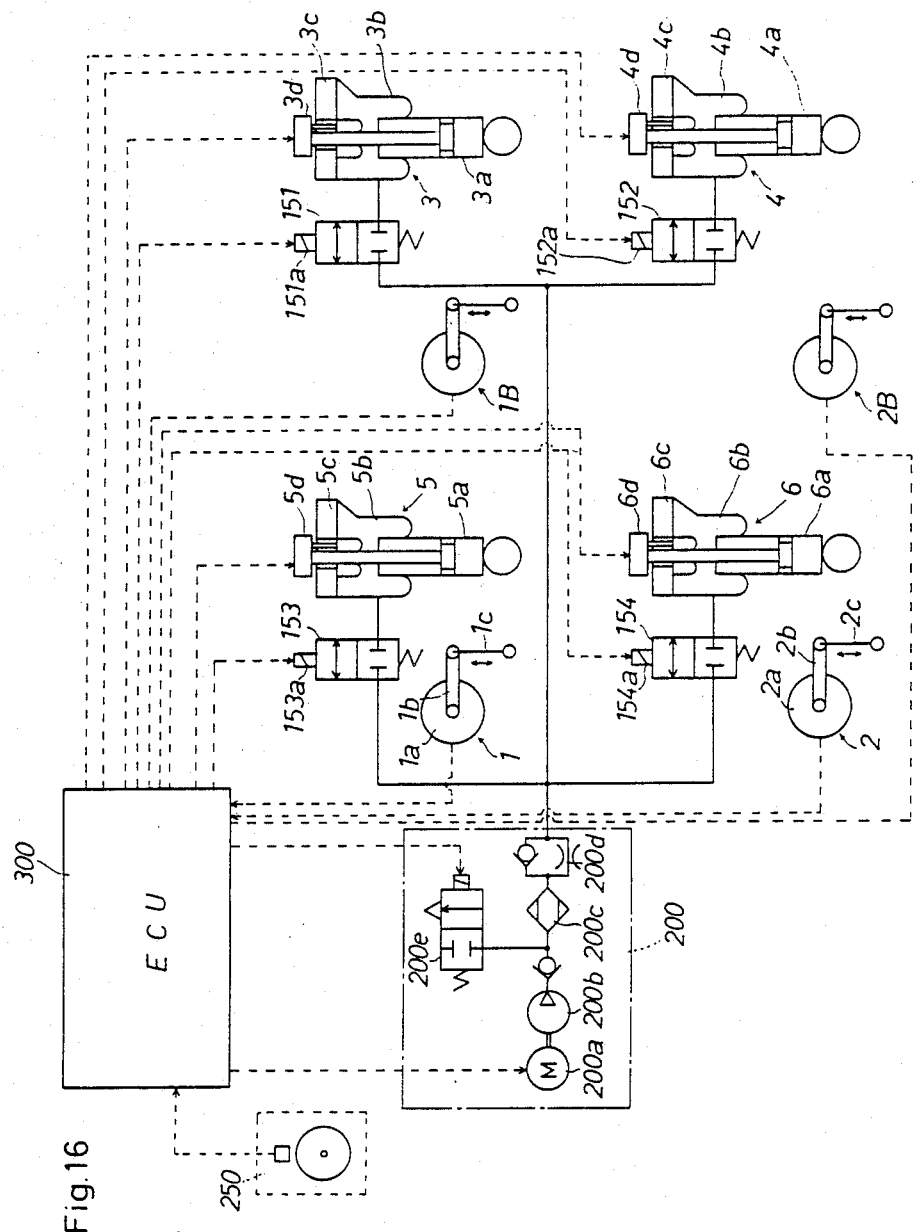
FIG. 16 is a system diagram showing the second embodiment.
Figure 17:
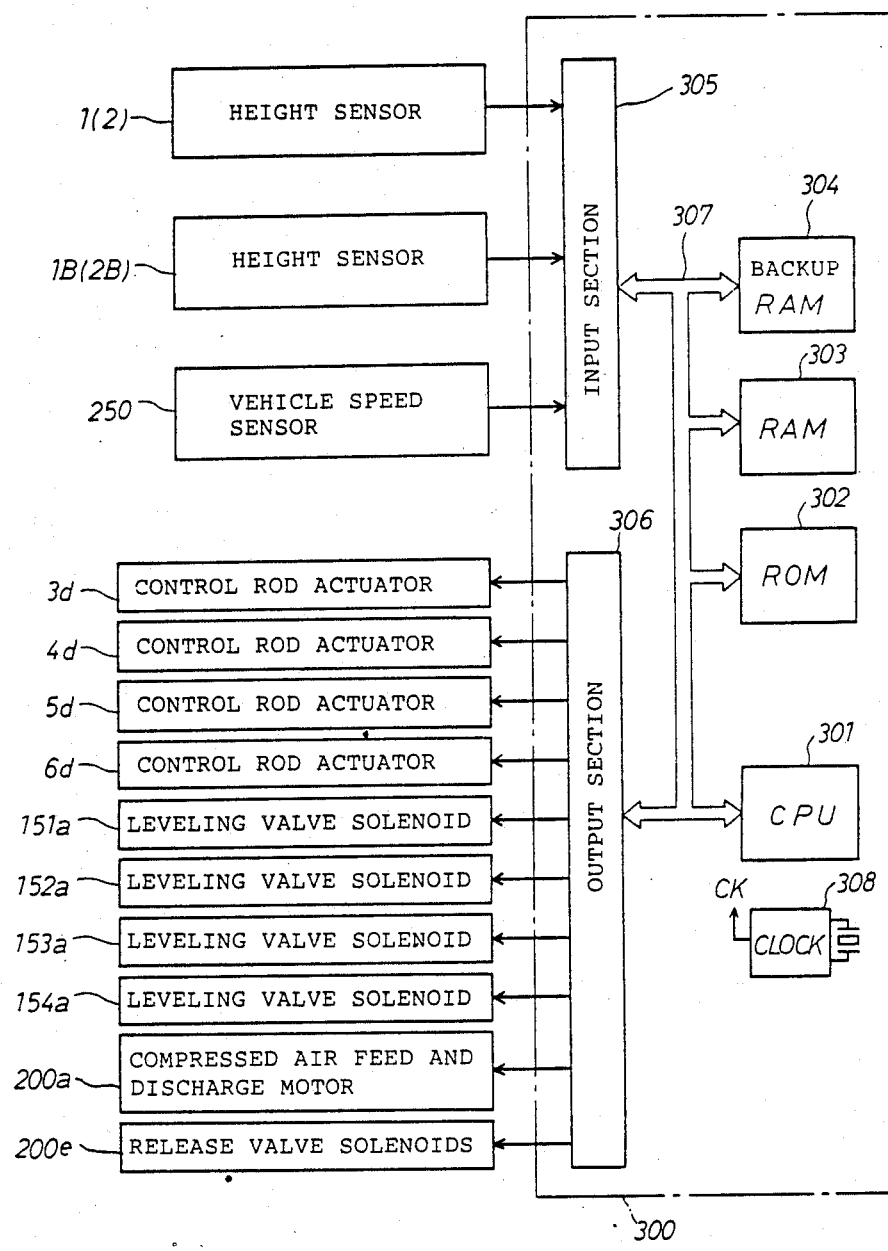
FIG. 17 is a block diagram of an electronic control unit of the second embodiment.

The followings are the explanation of a second embodiment of this invention. FIG. 16 denotes a rear vehicle height controller utilizing air suspensions as described in the second embodiment. While the constitution of the controller is same as that of the first embodiment, the vehicle height sensors 1B and 2B are equipped with the left and the right rear wheels, respectively. The constitution of the electronic control unit (ECU) in FIG. 16 is illustrated in FIG. 17 in detail, which is same as the first embodiment.

Figure 18A:
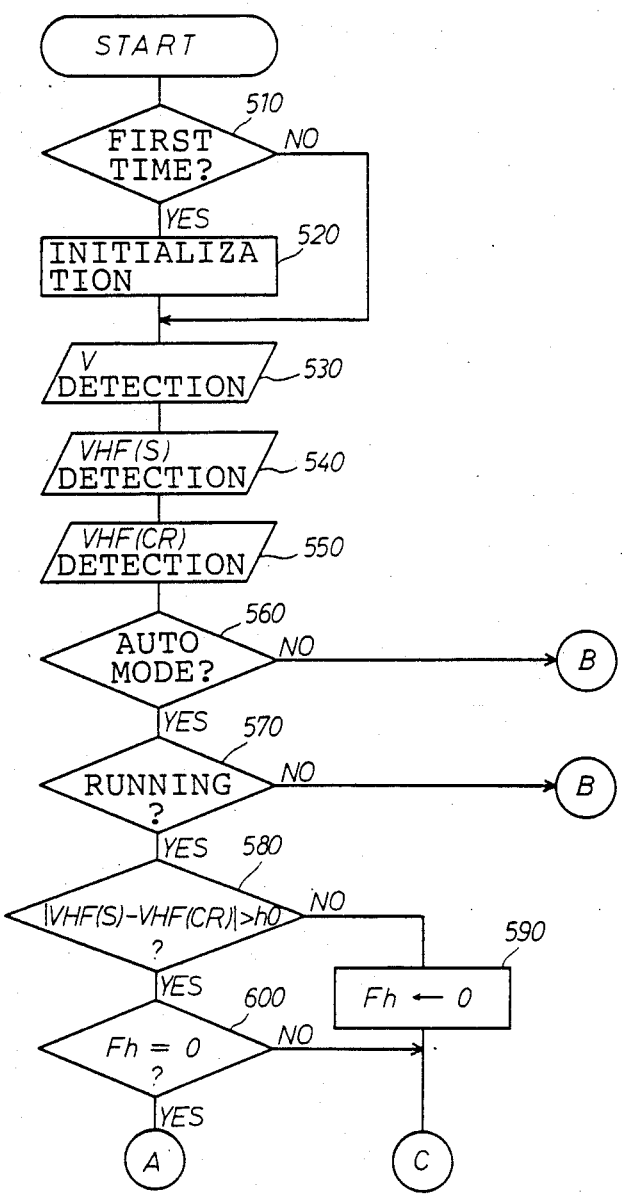
FIGS. 18A and 18B is a flowchart showing process steps performed in the second embodiment.
Figure 18B:
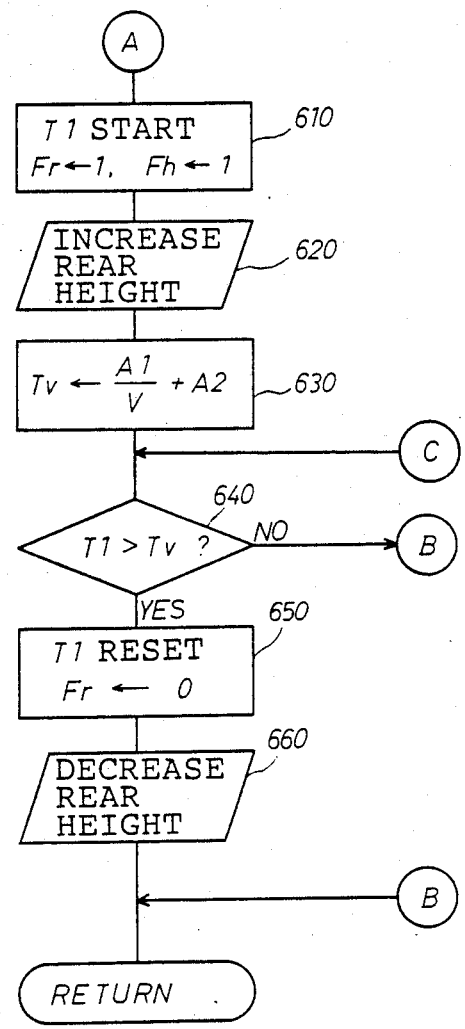

The process to be executed by the ECU in the embodiment is shown in the flow chart of FIG. 18 A,B which is almost same as FIG. 6A,B except that Steps 630 and 670 are eliminated. The flowcharts of FIGS. 6A–6D, 7 and 8 of the first embodiment are executed samely, resulting in the same timing charts shown in FIG. 9. So the explanation of the third embodiment is omitted.

The followings are the explanation of a third embodiment of this invention. The constitution of the third embodiment is the same as the second embodiment, as shown in FIGS. 16 and 17. The vehicle height sensors are equipped at each rear wheel and the distances between the vehicle body and the rear wheels are detected as are the rear vehicle heights.

The detected signals are input into the ECU 300 as same as in the front vehicle height sensors 1 and 2. In the ECU 300, the process steps of FIG. 11A and FIG. 11B are executed instead of the process steps of FIG. 6A–6D and FIG. 8. This process is a feature of the third embodiment.

Figure 19A:
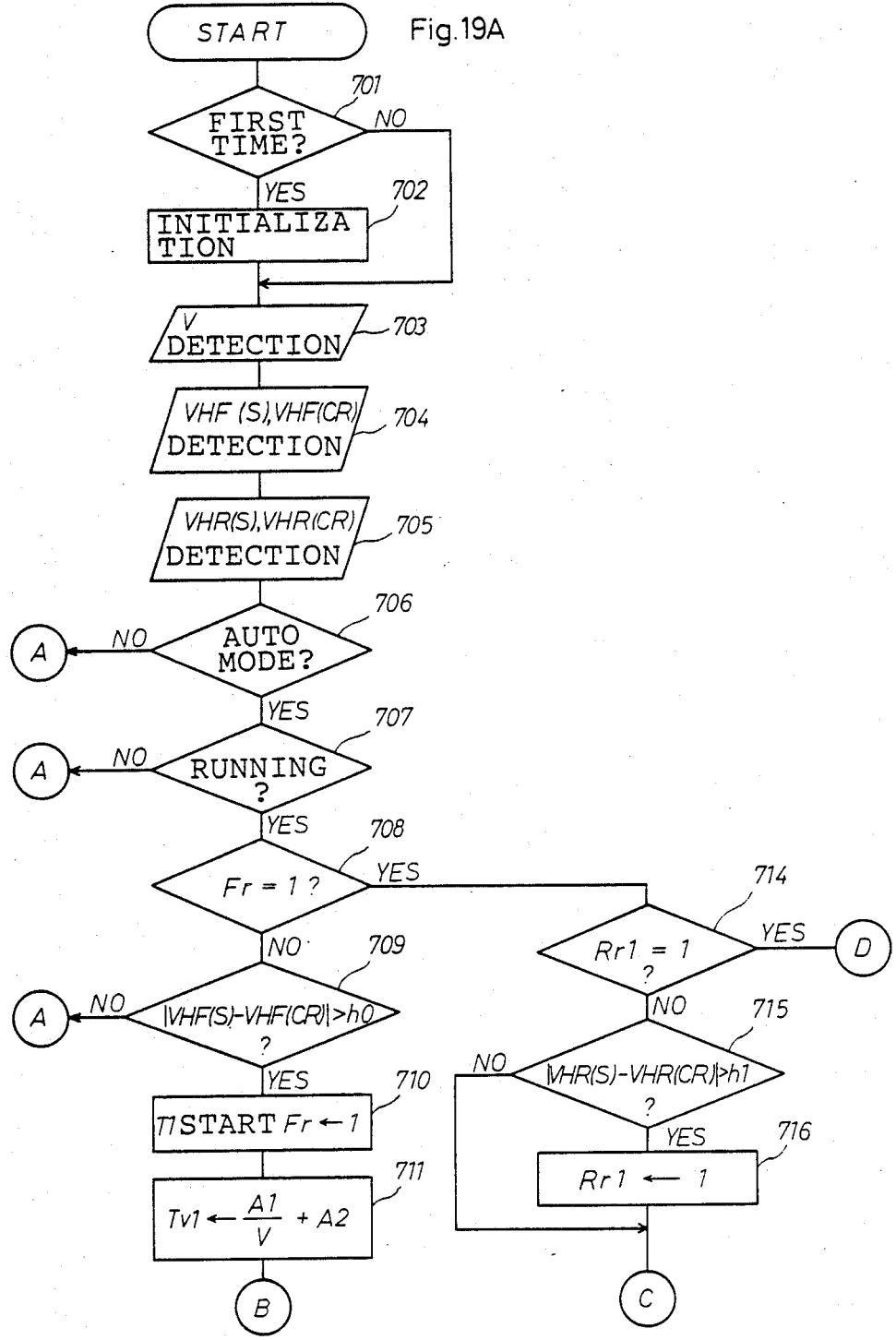
Figure 19B:
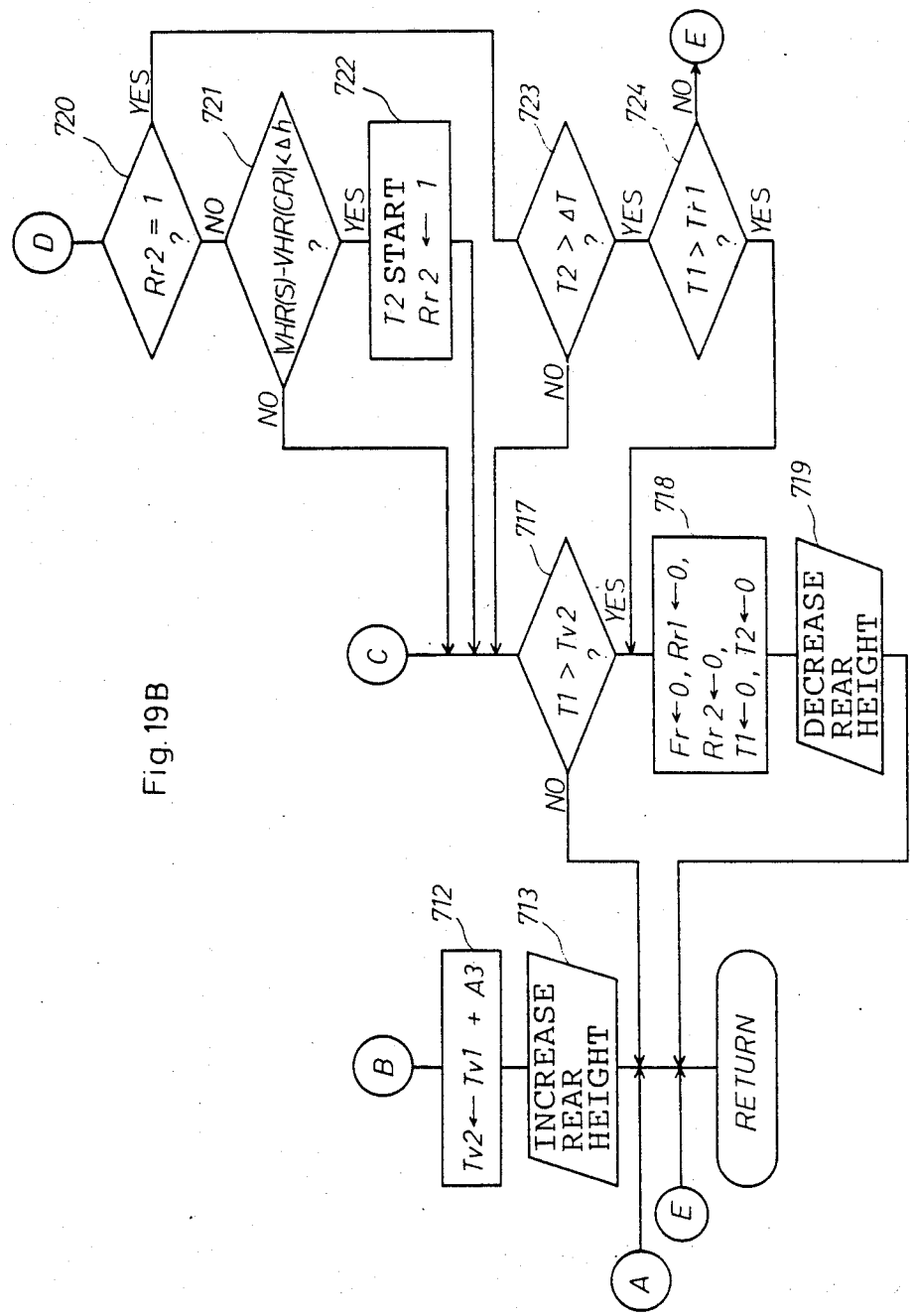
Figure 20A:
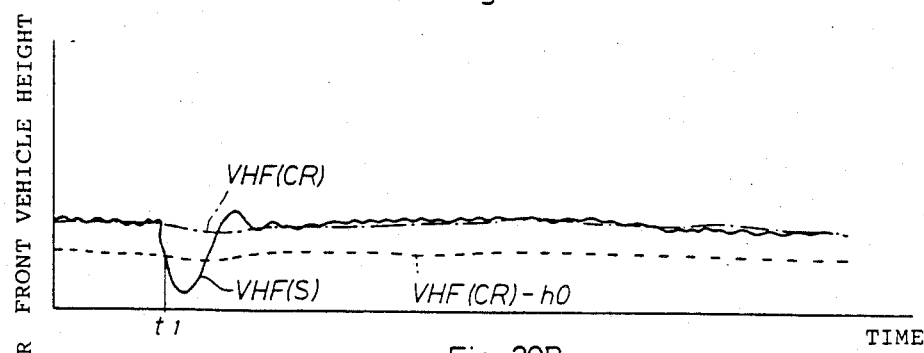
FIGS. 20A-20D are timing charts of the third embodiment.
Figure 20B:
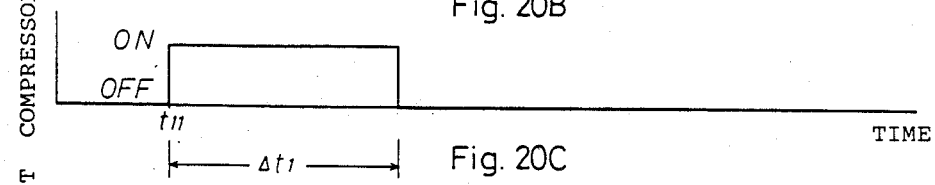
Figure 20C:
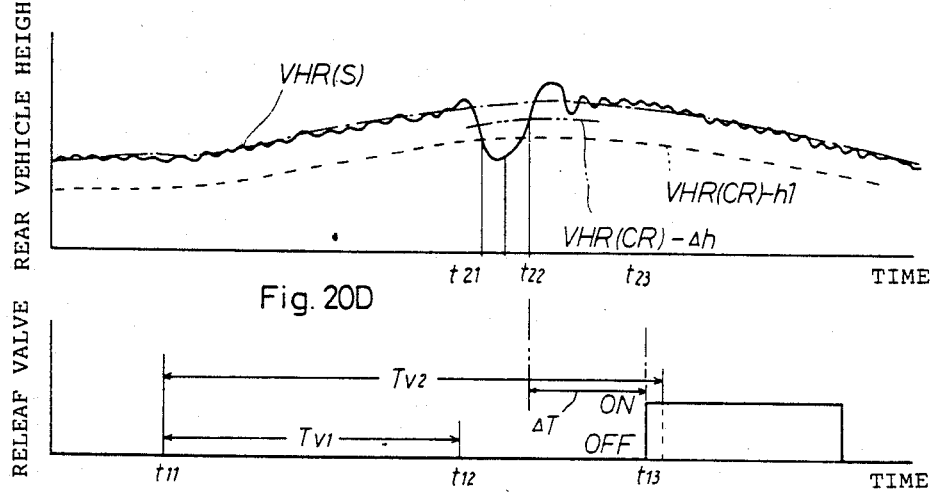
Figure 20D:
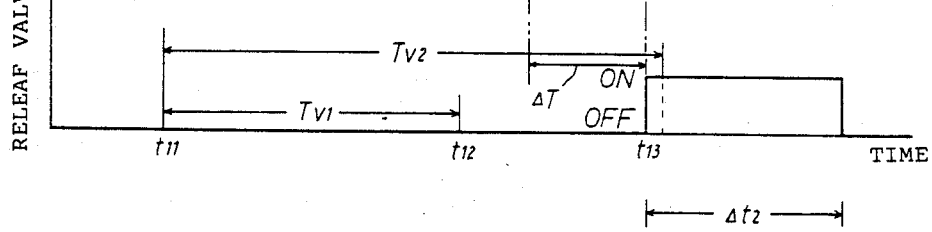

The followings are the detailed explanation of FIG. 19A 19B, and 19C. In the process step of FIG. 19A, the rear vehicle height is increased when a bump or a dip is detected at a front wheel, and it is restored to the normal state after a certain time interval has elapsed, as same as in FIG. 18A, 18B In this embodiment, besides that, the passing condition is accurately detected to shorten the restored time of rear vehicle height, thereby more precise control of vehicle height can be realized.

The initial process Steps 701, 702, 703, 707 are same as Steps 510, 520, 530, 560 and 570, respectively, therefore, the explanations are omitted.

The present front vehicle height VHF(S) and the average vehicle height VHF(CR) are detected (704), and then the present rear vehicle height VHR(S) and the averaged vehicle height VHR(CR) are detected (705). the above mentioned values are detected by means of the process just as same as in Steps 540 and 550 of the second embodiment.

If it is in an auto mode (706), and if it is judged that the vehicle is running (707), a judgement is performed whether a flag Fr is set or not (708). The flag Fr is a flag which indicates for performing vehicle height increasing operation for the rear wheel. The flag has been reset in the initial setting.

In the case that Fr equals 0, a judgment is made whether or not a displacement $|VHF(S)-VHF(CR)|$ of the current front vehicle height from the averaged front vehicle height exceeds a predetermined reference value h0 (709). In case the result is NO, the present routine is terminated.

If it is judged the displacement exceeds h0, a timer T1 is started and the flag Fr is set. The timer T1 is for checking the time interval for altering the rear vehicle height, and the flag Fr is for excuting the judgment to count up. FIG. 19C is a flowchart showing a routine repeatedly executed at every predetermined time interval for counting up timers.

The routine is so constructed to count up (752) the timer T1 if the flag Fr is set (751), and to count up (754) an undermentioned timer T2 if a flag Rr2 is set (753).

Next, the processing step returns to FIG. 19A, a minimum time interval Tv1 for prohibiting the lowering of the rear vehicle height is induced (711) on basis of the vehicle speed V from the following formula.

$$Tv1=(A1/V)+A2$$

A1: Wheelbase
A2: a correction factor (a constant)

Above-mentioned A2 is determined in consideration of a detection lags of the respective vehicle height sensors 1 and 2 and a time interval spent for the rear wheel to pass over the dip or a bump of the ground. Tv1 may well be a fixed value if it is set well long enough for the wheelbase to pass a point with a normal running speed.

Next, the maximum time interval Tv2 representing that the rear vehicle height is required to remain in the raising condition is induced (712) on basis of the above-mentioned minimum set time interval Tv1 from the following formula.

$$Tv2=Tv1+A3$$

A3: a correction factor (a constant)

Above-mentioned A3 is determined in consideration of the time interval spent for the rear wheel to pass over the dip or the bump of the ground completely.

Then, the raising operation is executed (713) for raising the vehicle height at the rear wheel. Explanation of this raising operation is omitted because this raising operation is same as that in Step 620 of the second embodiment.

Like this way, the present routine is terminated. The routine is then executed again. This time, however, since in the previous execution the flag Fr is set at Step 710, the judgment result in "YES" at Step 708.

After that, a judgment is made whether or not the flag Rr1 is set (714). The flag Rr1 is a flag representing that the vehicle height sensor provided with each rear wheel detects the dip or the bump of the ground.

In this case, the result of the judgment is made "NO" in Step 714, as the rear wheel does not reach to the dip or the bump of the ground and the flag Rr1 is yet in the initial reset condition.

After the previous judgment, a judgment is made (715) whether the displacement |VHR(S)−VHR(CR)| of the current vehicle height from the averaged front vehicle height exceeds a predetermined reference value h1. If the rear wheel does not reach the dip or the bump of the rear wheel and still the displacement is lower or equals h1, then the judgment is made (717) whether or not the timer started by the operation in Step 710 exceeds the maximum set value Tv2. Still further, the wheel does not in the condition of passing over the dip or the bump, the present routine is interrupted for a while. The above-mentioned condition that the wheeel does not passing over the dip or the bump of the road surface is limited to the condition that the rear front wheels has passes over the dip or the bump of the ground but the rear wheel has not yet passed over the dip or the bump of the ground.

When it becomes T1 >Tv2, the judgment result is made "YES" in Step 717, the flag Fr, Rr1 and Rr2 are rest. and the timers T1 and T2 are cleared (718).

Next to the above-mentioned operation, rear vehicle height is restored (719) to the original vehicle height. Accordingly, an operation (719) for restoring the original vehicle height is executed so as not to keep the vehicle height in the condition of raising for a time interval no longer than the timer interval Tv2, regardless of the detection of the dip or the bump of the ground (715). The reason why this embodiment is operated as such is for sake of preventing deterioration of the ride comfort, and deterioration of controllability an the stability of the vehicle, and nose dive of the vehicle inevitably accompanied with raising the rear vehicle height for a long time interval due to a detection miss of the rear vehicle height sensor, or a detection failure caused by the moving of the object that makes the road uneven, after the front wheel passes over it.

Following are the description that the present embodiment prepared against the case that the rear vehicle height sensor detects the dip or the bump of the ground at the time point before the time point when T1 is larger than Tv2 in Step 717 in the above-mentioned condition. The above-mentioned condition is the condition that rear vehicle height VHR(S) and the averaged rear vehicle height VHR(CR) has a relationship |VHR(S)−VHR(CR)| >h1. h1 is a value set for detecting the riding on of the rear wheel. Like this, judgment result is made "YES" at Step 715, and then the flag Rr1 is set (716). Next, upon the detection of T1 greater than T2 (717), the present routine is interrupted for a while.

Next, when the operation is started repeatedly again, judgment result is made "YES" at Step 714 due to Rr=1 so as to judge whether a flag Rr2 is set or not (720). The flag Rr2 is the flag representing whether or not the rear vehicle height is under the condition that satisfies the following formula.

|VHR(S)−VHR(CR)| <dh.

In this case, however, h1 is greater than dh (delta-h in the figure), and dh represents a standard point utilized for judging whether the rear vehicle height is restored to ordinary height.

If |VHR(S)−VHR(CR)| is not under the condition smaller than dh, judgment result is made "NO" in Step 720, and in Step 721 followed by Step 720, the judgment result is made "NO" as the Step 721 is the step for judging whether |VHR(S)−VHR(CR)| is smaller than dh, and then the present routine is terminated in response to the formula T1 >Tv2.

After the previous processing, the operation goes from Step 701 to terminate through Steps 708, 714, 720, 721 and 717 is repeatedly executed. This operation is executed limited to the case T1 is smaller or equals to Tv2. therefore, in the case T1 is larger than Tv2, rear vehicle height is restored to the original height (719) in response to the judgment result "YES" in Step 717.

When |VHR(S)−VHR(CR)| becomes decreased to be smaller than dh, the judgment result is made "YES" for starting the timer T2 and resetting the flag Rr2. The timer T2 has a role to restore the rear vehicle height to the original height when a time interval dT (delta-T in the figure) has been elapsed after the time point when the rear wheel passes over the dip or the bump of the ground.

When the processing step is advanced to Step 720 again after the operation as above, the judgment result is made "YES" as Rr equals 1, and then judgment is made (723) whether or not the timer T2 exceeds dT. If T2 does not exceed dT, the processing is advanced to Step 717, on the contrary, if T1 equals or smaller than T2, the rear vehicle height is never restored to the original condition.

After the above-mentioned processings, T2 is larger than dT, the judgement result is made "YES" at Step 723, the relationship of T1>Tv1 is confirmed to make sure the control perfectly ate Step 724 so as to prevent performing inadequate control probably performed due to a mere detection error and a detection errors additionally caused by another continuous unevenness of the ground, and then rear vehicle height is restored to the original height after the processings of Step 718 and Stpe 719. In step 724, T1 is smaller or equals to Tv1, the judgment result is made "NO" and the processing terminated without restoring original vehicle height for fear that the rear wheel passes over the dip or the bump of the ground just after the restoring of the vehicle height then the processing is terminated without restoring the vehicle height to original state.

FIG. 20 is a timing chart showing the above-mentioned operation. FIG. 20A is a timing chart of the front vehicle height, FIG. 20B is a timing chart of a driving signal of a compressor, FIG. 20C shows a timing chart of the rear vehicle height, and FIG. 20D shows the flowchart of the discharge valve. The figures respectively show example of the riding of the rear wheel over the dip of the ground. The front vehicle height VHF(S) exceed the value of VHR(CR)−h0 at a time point t11, the vehicle height is raised in response to the output dt1 from the compressor from then on. Furthermore, the time intervals Tv1 and Tv2 are set, taking both wheel speed wheelbase and vehicle height raising speed. Tv1 is a minimum set time interval for prohibiting the vehicle height lowering operation. The reason why the minimum set time interval for prohibiting the vehicle height lowering operation is set is that the rear wheel never reaches the bump of the ground before the time point t12 when Tv1 is elapsed from a time point t1.

Tv2 is a maximum set time interval for starting vehicle height lowering operation. In specific, the maximum time interval is a time interval showing that the rear wheel has definitely passed over the dip of the ground that is detected by the front wheel at the time point t11, before a time point t11.

In the examples of the embodiment, the vehicle height lowering operation is started during the time interval dT from a time point t22 and till a time point t23, in consideration of the timer for suppressing the vibration of the vehicle, and the vehicle height lowering operation is terminated before a time point t2.

Considering another condition, for example, the condition that the dip of the ground can not be detected by some reasons, such as the detection error at the time point t13, the vehicle height lowering operation is executed because maximum set time interval Tv2 prepared for the stating of the vehicle height lowering operation is set. This vehicle height lowering operation is started whether the time point t22 or the time point t23 is later than the time point t13, regardless of the detection of the bump of the grand by the rear wheel.

On the contrary, the time points t21 through t23 are in the range of the time points t11 through t12, vehicle height lowering operation is prohibited at least till the time point t12 for taking the detection errors into consideration.

According to the embodiment of the present invention, the control is performed in accordance with occasions and the timings that the dips or the bumps of the ground are detected by alternatively selecting Tv1 or Tv2 according to the detection timing of the rear wheel, as well as setting two time intervals, one is the minimum time interval Tv1 for prohibiting the restoring of the vehicle height to the original state, and another is the maximum time interval Tv2 for prohibiting the restoring of the vehicle height to the original state. As the embodiment of the present invention is constructed such that, more adequate and finer control becomes possible even when the vehicle has to be prepared against continuous uneven part of the ground and the detection errors are occurred.

The above-mentioned second and third embodiment, wherein raise in the vehicle height is judged on basis of the judgment whether or not the difference between the averaged vehicle height VHF(CR) and the current vehicle height VHF(S) is beyond the range of dh, but another construction is adoptable such as to judge on basis of changing speed of the vehicle height, acceleration, or vibration.

The present invention adoptable the construction to perform the judgment on basis of the acceleration capable of judging the initial condition of riding over the dip or the bump of the ground is capable of preparing against the dip or the bump of the ground, and then the present invention having a construction as such is effective particularly in case the controllability and the stability of the vehicle must be thought much of, by dint of the vibration.

What is claimed is:

1. A rear suspension controller for a vehicle having a suspension between a vehicle body and a rear wheel comprising:
   a front height detection means for measuring a distance between the vehicle body and a front wheel for generating a front height signal indicating the height of the vehicle;
   a judgment means for generating a judgment result signal when the front height signal exceeds a predetermined range, said predetermined range being independent of a rear height value; and
   a rear height control means for increasing the rear vehicle height when the judgment means generates the judgment result signal.

2. A rear suspension controller according to claim 1, further comprising a rear suspension characteristic alteration means for controlling the rear suspension characteristic when the judgment means generates the judgment result signal.

3. A rear suspension controller according to claim 2, wherein the rear suspension characteristic alteration means controls the spring constant of rear air suspensions (S2Lc).

4. A rear suspension controller according to claim 2, wherein the rear suspension characteristic alteration means controls the damping force of rear shock absorbers (S2Lc).

5. A rear suspension controller according to claim 2, wherein the rear suspension characteristic alteration means controls the stiffness of bushes fitted in joints of rear control arms.

6. A rear suspension controller according to claim 2, wherein the rear suspension characteristic alteration means controls the compliance of a rear stabilizer 1410).

7. A rear suspension controller according to claim 1, wherein the rear height control means changes the rear vehicle height to the normal condition after a predetermined time interval has elapsed since the judgment result signal is generated.

8. A rear suspension controller according to claim 7, wherein the time interval is determined by a current vehicle speed.

9. A rear suspension controller according to claim 1, wherein the rear height control means generates an actuator drive signal to control air suspensions when the front height signal exceeds the predetermined range.

10. A rear suspension controller according to claim 1, wherein the rear vehicle height control means increases the rear vehicle height by charging air into rear air suspensions.

* * * * *